US012425776B2

(12) United States Patent
Ryu et al.

(10) Patent No.: US 12,425,776 B2
(45) Date of Patent: Sep. 23, 2025

(54) VIBRATION APPARATUS AND APPARATUS INCLUDING THE SAME

(71) Applicant: LG Display Co., Ltd., Seoul (KR)

(72) Inventors: Kyungyeol Ryu, Gyeonggi-do (KR); Minji Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 337 days.

(21) Appl. No.: 18/126,834

(22) Filed: Mar. 27, 2023

(65) Prior Publication Data

US 2024/0214745 A1 Jun. 27, 2024

(30) Foreign Application Priority Data

Dec. 26, 2022 (KR) ........................ 10-2022-0184011

(51) Int. Cl.

*H04R 17/00* (2006.01)
*H04R 1/02* (2006.01)
*H04R 1/28* (2006.01)

(52) U.S. Cl.

CPC ............. *H04R 17/00* (2013.01); *H04R 1/028* (2013.01); *H04R 1/2834* (2013.01); *H04R 2499/15* (2013.01)

(58) Field of Classification Search

CPC ....... H04R 17/00; H04R 1/028; H04R 1/2834
See application file for complete search history.

(56) References Cited

U.S. PATENT DOCUMENTS

| | | | | |
|---|---|---|---|---|
| 2004/0183407 A1* | 9/2004 | Takeshima | ............. | H04R 17/00 310/331 |
| 2020/0233629 A1* | 7/2020 | Yeon | ...................... | G10K 9/125 |
| 2021/0304920 A1* | 9/2021 | Ko | .......................... | G06F 3/016 |
| 2021/0306741 A1* | 9/2021 | Kim | ...................... | H04R 1/403 |

FOREIGN PATENT DOCUMENTS

| | | |
|---|---|---|
| KR | 10-2011-0045435 A | 5/2011 |
| KR | 10-2011-0075193 A | 7/2011 |
| KR | 10-2013-0044690 A | 5/2013 |
| KR | 10-2016-0027391 A | 3/2016 |
| WO | WO 2014/030793 A1 | 2/2014 |

* cited by examiner

*Primary Examiner* — Olisa Anwah
(74) *Attorney, Agent, or Firm* — Birch, Stewart, Kolasch & Birch, LLP

(57) ABSTRACT

A vibration apparatus can include a vibration generating portion including at least one or more vibration portions, a first cover member disposed at a first surface of the vibration generating portion, a second cover member disposed at a second surface of the vibration generating portion being different from the first surface of the vibration generating portion, a signal cable electrically connected with the vibration generating portion, and a connection member disposed between the first cover member and the second cover member to connect the vibration generating portion with the signal cable.

32 Claims, 17 Drawing Sheets

10 : 10-1, 10-2

10 : 10-1, 10-2

VIBRATION APPARATUS AND APPARATUS INCLUDING THE SAME

CROSS-REFERENCE TO RELATED APPLICATIONS

This application claims priority to Korean Patent Application No. 10-2022-0184011, filed in the Republic of Korea on Dec. 26, 2022, the entire contents of which are hereby expressly incorporated by reference into the present application.

BACKGROUND

Technical Field

The present disclosure relates to a vibration apparatus and an apparatus including the same.

Discussion of the Related Art

Recently, the demands for slimming and thinning electronic devices are increasing. In speakers applied to electronic devices, piezoelectric devices capable of being implemented to have a thin thickness are attracting much attention instead of voice coils, based on the demands for slimness and thinness.

Speakers or vibration apparatuses to which a piezoelectric device is applied can be supplied with a driving power or a driving signal through a signal cable and can be driven or can vibrate.

Vibration apparatuses (or film actuators) include a film having a line for applying a driving power to a piezoelectric device and a pad electrode. The vibration apparatuses need a process of patterning the line and the pad electrode on the film, and a soldering process of electrically connecting the pad electrode with a signal cable.

SUMMARY OF THE DISCLOSURE

The inventors have done various researches and experiments for implementing a vibration apparatus where a manufacturing process and a structure of the vibration apparatus are simplified. The inventors have thus invented a vibration apparatus having a new structure and an apparatus including the vibration apparatus, in which a manufacturing process and a structure of the vibration apparatus are simplified, based on the various researches and experiments.

An aspect of the present disclosure is directed to providing a vibration apparatus and an apparatus including the same, in which a structure thereof and a manufacturing process are simplified.

Another aspect of the present disclosure is directed to providing a vibration apparatus and an apparatus including the same, which can prevent the occurrence of a crack or damage of a vibration generating portion which can be caused by a step height between the lines of a signal cable in the manufacturing process of the vibration apparatus.

Another aspect of the present disclosure is directed to providing a vibration apparatus and an apparatus including the same, which can enhance the sound pressure level characteristic of a sound.

Additional features and aspects of the disclosure will be set forth in part in the description that follows, and in part will be apparent from the description, or can be learned by practice of the inventive concepts provided herein. Other features and aspects of the inventive concepts can be realized and attained by the structure particularly pointed out in the written description, or derivable therefrom, and claims hereof as well as the appended drawings.

To achieve these and other aspects of the inventive concepts, as embodied and broadly described herein, a vibration apparatus comprises a vibration generating portion including at least one or more vibration portions, a first cover member at a first surface of the vibration generating portion, a second cover member at a second surface of the vibration generating portion, the second surface being different from the first surface of the vibration generating portion, a signal cable electrically connected with the vibration generating portion, and a connection member between the first cover member and the second cover member and configured to connect the vibration generating portion with the signal cable.

In another aspect of the present disclosure, an apparatus comprises a passive vibration member and a vibration generating apparatus connected with the passive vibration member to vibrate the passive vibration member. The vibration apparatus includes a vibration generating portion including at least one or more vibration portions, a first cover member at a first surface of the vibration generating portion, a second cover member at a second surface of the vibration generating portion, the second surface being different from the first surface of the vibration generating portion, a signal cable electrically connected with the vibration generating portion, and a connection member between the first cover member and the second cover member and configured to connect the vibration generating portion with the signal cable.

Other systems, methods, features and advantages according to the present disclosure will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
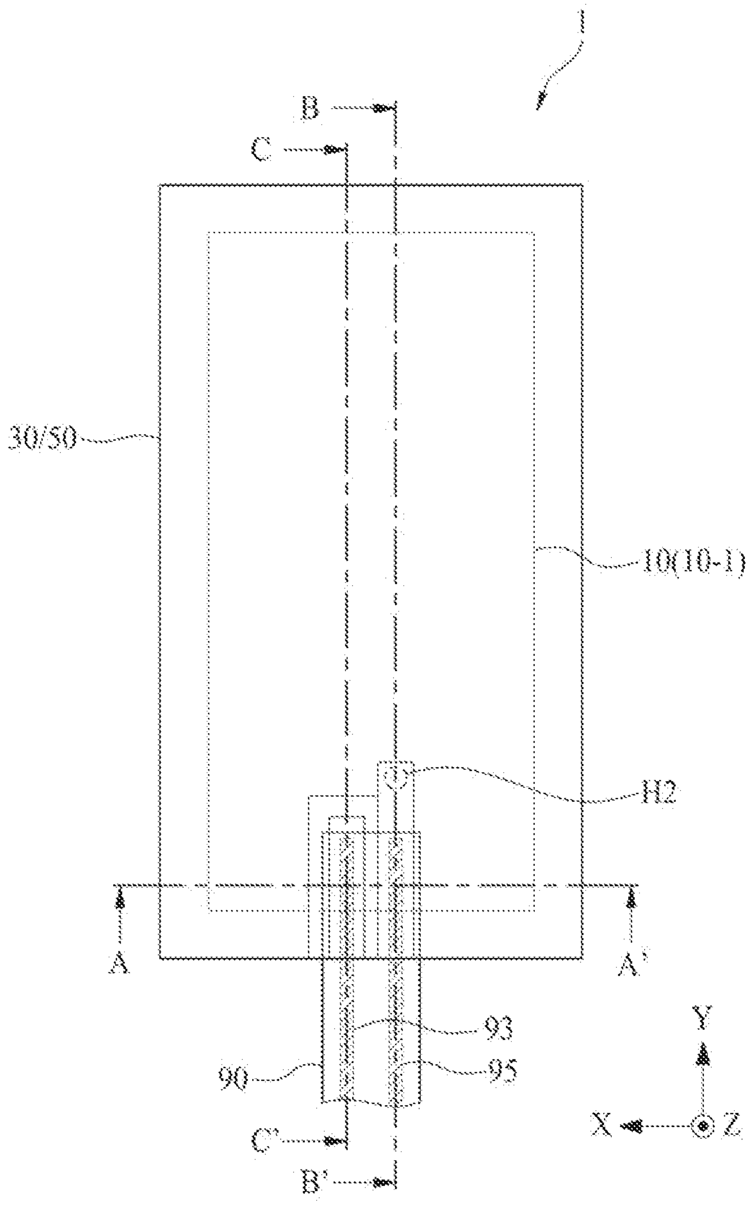
FIG. 1 illustrates a vibration apparatus according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Reference is now be made in detail to embodiments of the present disclosure, examples of which can be illustrated in the accompanying drawings. In the following description, when a detailed description of well-known functions or configurations can unnecessarily obscure aspects of the present disclosure, the detailed description thereof can be omitted for brevity. The progression of processing steps and/or operations described is an example; however, the sequence of steps and/or operations is not limited to that set forth herein and can be changed, with the exception of steps and/or operations necessarily occurring in a particular order.

Unless stated otherwise, like reference numerals can refer to like elements throughout even when they are shown in different drawings. In one or more aspects, identical elements (or elements with identical names) in different drawings can have the same or substantially the same functions and properties unless stated otherwise. Names of the respective elements used in the following explanations are selected only for convenience and can be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, areas, ratios, angles, numbers, and the like disclosed in the drawings for describing embodiments of the present disclosure are merely examples, and thus, the present disclosure is not limited to the illustrated details.

When the term "comprise," "have," "include," "contain," "constitute," "make up of," "formed of," or the like is used, one or more other elements can be added unless a term such as "only" or the like is used. The terms used in the present disclosure are merely used in order to describe particular or example embodiments, and are not intended to limit the scope of the present disclosure. The terms of a singular form can include plural forms unless the context clearly indicates otherwise. The word "exemplary" is used to mean serving as an example or illustration. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range can be caused by various factors (e.g., process factors, internal or external impact, noise, or the like). Further, the term "may" encompasses all the meanings of the term "can."

In describing a positional relationship, where the positional relationship between two parts is described, for example, using "on," "over," "under," "above," "below," "beneath," "near," "close to," or "adjacent to," "beside," "next to," or the like, one or more other parts can be located between the two parts unless a more limiting term, such as "immediate(ly)," "direct(ly)," or "close(ly)," is used. For example, when a structure is described as being positioned "on," "over," "under," "above," "below," "beneath," "near,"

"close to," or "adjacent to," "beside," or "next to" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," "before," "preceding," "prior to," or the like, a case that is not consecutive or not sequential can be included unless a more limiting term, such as "just," "immediate(ly)," or "direct(ly)," is used.

It is understood that, although the term "first," "second," or the like can be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like can be arbitrarily named according to the convenience of those skilled in the art without departing from the scope of the present disclosure. The terms "first," "second," and the like can be used to distinguish components from each other, but the functions or structures of the components are not limited by ordinal numbers or component names in front of the components.

In describing elements of the present disclosure, the terms "first," "second," "A," "B," "(a)," "(b)," or the like can be used. These terms are intended to identify the corresponding element(s) from the other element(s), and these are not used to define the essence, basis, order, sequence or number of elements.

For the expression that an element or layer is "connected," "coupled," or "adhered" to another element or layer the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" can be understood as element A and/or element B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two.

In one or more aspects, the phrases "each other" and "one another" can be used interchangeably simply for convenience unless stated otherwise. For example, an expression "different from each other" can be understood as being different from one another. In another example, an expression "different from one another" can be understood as being different from each other. In one or more examples, the number of elements involved in the foregoing expression can be two. In one or more examples, the number of elements involved in the foregoing expression can be more than two.

Features of various embodiments of the present disclosure can be partially or overall coupled to or combined with each other, and can be variously inter-operated, linked or driven together. The embodiments of the present disclosure can be carried out independently from each other or can be carried out together in co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

Hereinafter, embodiments of a display apparatus according to various example embodiments of the present disclosure will be described in detail with reference to the accompanying drawings. All components of the display apparatus according to all embodiments of the present disclosure are operatively coupled and configured.

With respect to reference numerals to elements of each of the drawings, although the same elements can be illustrated in other drawings, like reference numerals can refer to like elements unless stated otherwise. In addition, for convenience of description, a scale, dimension, size, and thickness of each of the elements illustrated in the accompanying drawings can differ from an actual scale, dimension, size, and thickness, and thus, embodiments of the present disclosure are not limited to a scale, dimension, size, and thickness illustrated in the drawings.

Figure 2:
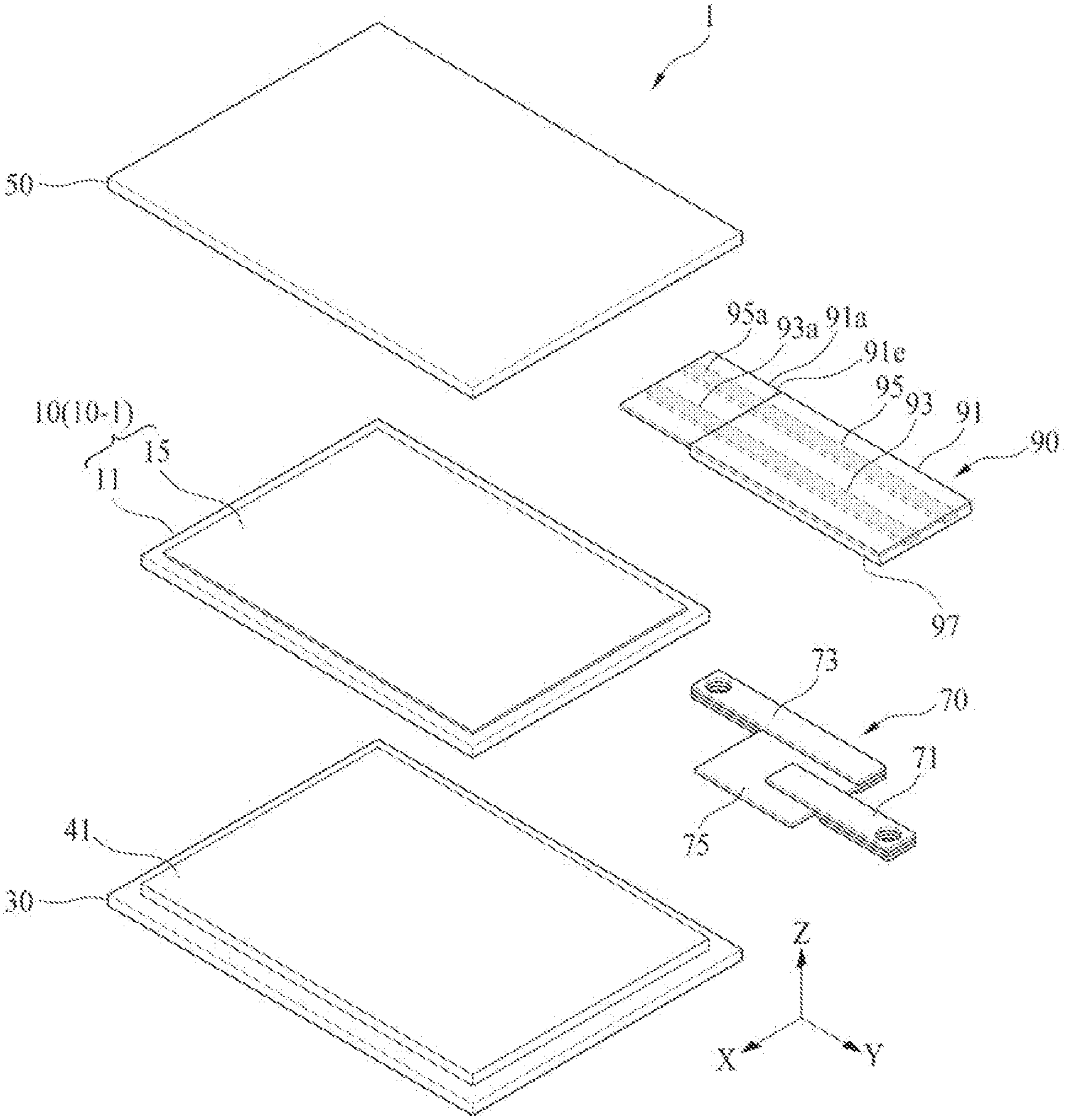
FIG. 2 is an exploded perspective view of the vibration apparatus illustrated in FIG. 1 according to an embodiment of the present disclosure.
Figure 3:
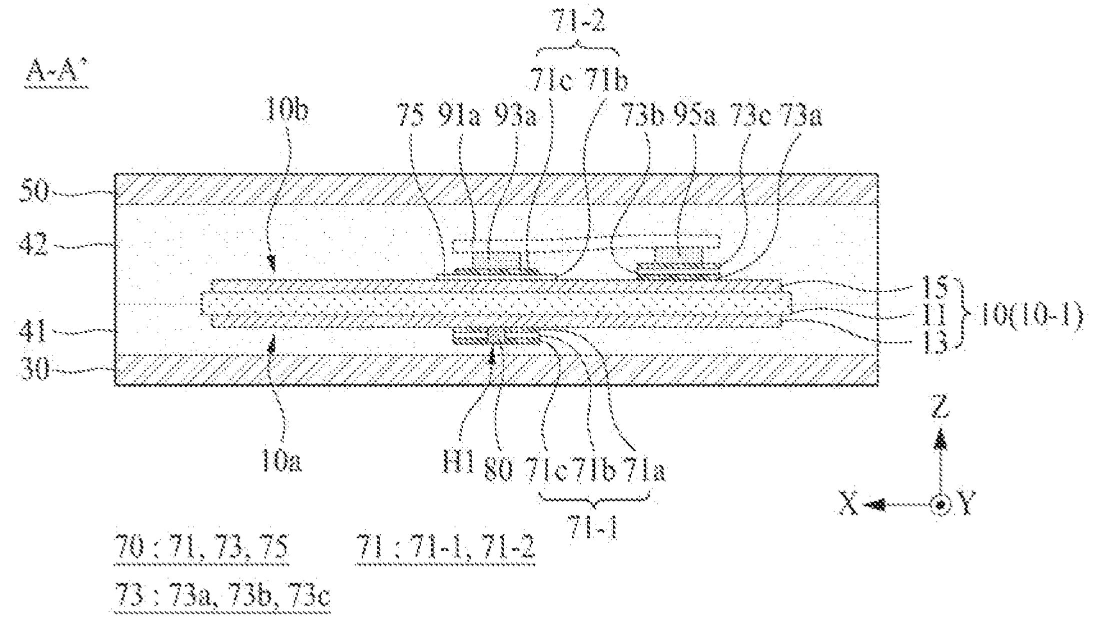
FIG. 3 is a cross-sectional view taken along line A-A' illustrated in FIG. 1 according to an embodiment of the present disclosure.
Figure 4:
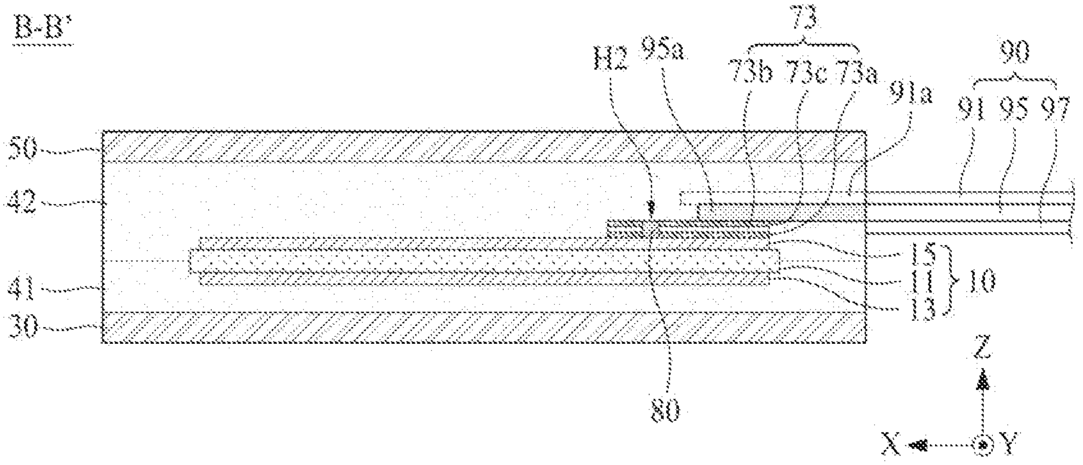
FIG. 4 is a cross-sectional view taken along line B-B' illustrated in FIG. 1 according to an embodiment of the present disclosure.
Figure 5:
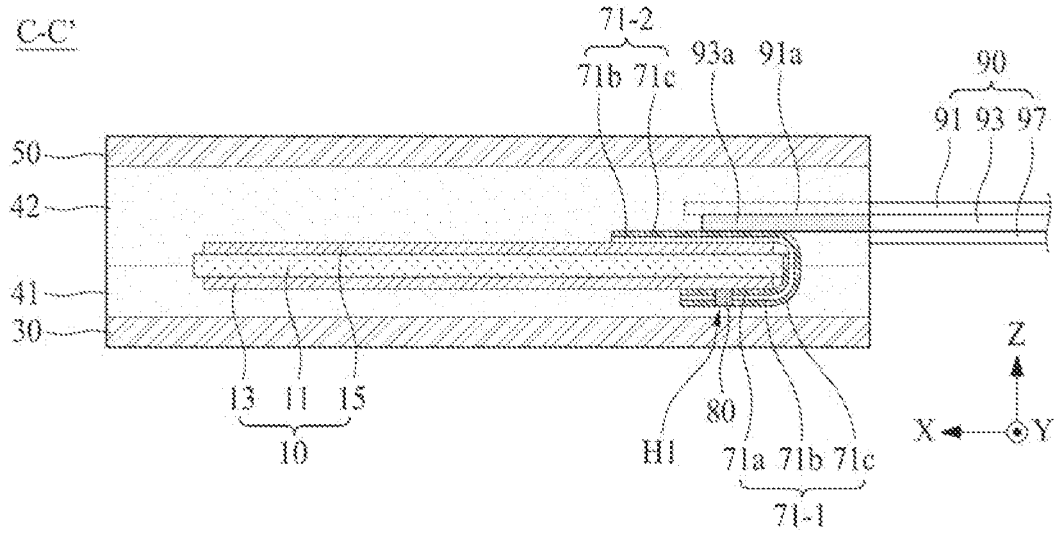
FIG. 5 is a cross-sectional view taken along line C-C' illustrated in FIG. 1 according to an embodiment of the present disclosure.
Figure 6:
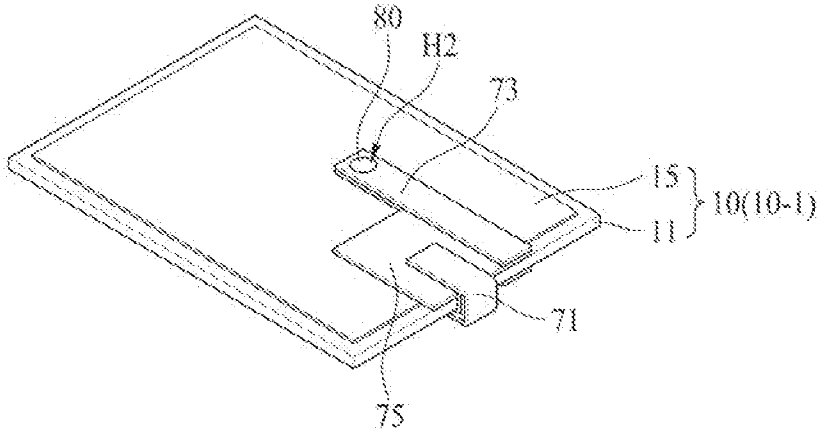
FIG. 6 is a perspective view illustrating an arrangement structure between a vibration generating portion and a connection member illustrated in FIG. 1 according to an embodiment of the present disclosure.

FIG. 1 illustrates a vibration apparatus according to an embodiment of the present disclosure. FIG. 2 is an exploded perspective view of the vibration apparatus illustrated in FIG. 1 according to an embodiment of the present disclosure. FIG. 3 is a cross-sectional view taken along line A-A' illustrated in FIG. 1 according to an embodiment of the present disclosure. FIG. 4 is a cross-sectional view taken along line B-B' illustrated in FIG. 1 according to an embodiment of the present disclosure. FIG. 5 is a cross-sectional view taken along line C-C' illustrated in FIG. 1 according to an embodiment of the present disclosure. FIG. 6 is a perspective view illustrating an arrangement structure between a vibration generating portion and a connection member illustrated in FIG. 1 according to an embodiment of the present disclosure.

Referring to FIGS. 1 to 3, a vibration apparatus 1 according to an embodiment of the present disclosure can include a vibration generating portion 10, a first cover member 30, a second cover member 50, a connection member 70, and a signal cable 90.

The vibration generating portion 10 can be configured to vibrate based on a driving signal (or a sound signal or a voice signal) supplied through the signal cable 90. For example, the vibration generating portion 10 can include a first surface 10*a* and a second surface 10*b* opposite to the first surface 10*a*. In the vibration generating portion 10, the first surface 10*a* can be a lower surface, a rear surface, a backside surface, a lowermost electrode layer, a lowermost electrode portion, or a lowermost electrode surface. The second surface 10*b* can be an upper surface, a front surface, an uppermost electrode layer, an uppermost electrode portion, or an uppermost electrode surface.

The vibration generating portion 10 according to an embodiment of the present disclosure can include one or more vibration portions 10-1. For example, the vibration generating portion 10 according to an embodiment of the present disclosure can have a single-layer structure and can include one vibration portion 10-1. In the following description, the "one or more vibration portions 10-1" can be referred to as a "vibration portion 10-1".

The vibration portion 10-1 can include a vibration layer 11, a first electrode layer 13, and a second electrode layer 15.

The vibration layer 11 can be provided between the first electrode layer 13 and the second electrode layer 15. The vibration layer 11 can include a piezoelectric material or an electroactive material having a piezoelectric effect. For example, the piezoelectric material can have a characteristic where pressure or twisting is applied to a crystal structure by an external force, a potential difference occurs due to dielectric polarization caused by a relative position change of a positive (+) ion and a negative (−) ion, and a vibration is generated by an electric field based on a voltage applied thereto. The vibration layer 11 can include a ceramic-based material for implementing a relatively high vibration, or can include piezoelectric ceramic having a perovskite-based crystal structure.

The piezoelectric ceramic can include single-crystal ceramic having a single-crystal structure, or can include a ceramic material or poly-crystal ceramic having a polycrystal structure. A piezoelectric material including single-crystal ceramic can include aluminum phosphate (for example, berlinite and $\alpha$-$AlPO_4$), silicon dioxide (for example, $\alpha$-$SiO_2$), lithium niobate ($LiNbO_3$), terbium molybate ($Tb_2(MoO_4)_3$), lithium tetraborate ($Li_2B_4O_7$), or zinc oxide (ZnO), but embodiments of the present disclosure are not limited thereto. The piezoelectric material including single-crystal ceramic can include a lead zirconate titanate (PZT)-based material including lead (Pb), zirconium (Zr), and titanium (Ti) or can include a lead zirconate nickel niobate (PZNN)-based material including lead (Pb), zirconium (Zr), nickel (Ni), and niobium (Nb), but embodiments of the present disclosure are not limited thereto. As another example, the vibration layer 11 can include at least one of $CaTiO_3$, $BaTiO_3$, and $SrTiO_3$ without Pb, but embodiments of the present disclosure are not limited thereto.

The vibration layer 11 according to an embodiment of the present disclosure can include a piezoelectric sintered material (or piezoelectric ceramic) which is manufactured by sintering (or firing) a piezoelectric powder (or a ceramic powder) at a high sintering (or firing) temperature of 1,200° C. or more, but embodiments of the present disclosure are not limited thereto. For example, the piezoelectric sintered material can be manufactured by a high temperature sintering process performed on a piezoelectric powder disposed on a high temperature firing paper.

The vibration layer 11 can include a first surface and a second surface opposite to the first surface. For example, the first surface of the vibration layer 11 can be a lower surface, a rear surface, or a backside surface. The second surface of the vibration layer 11 can be an upper surface or a front surface.

The first electrode layer 13 can be provided on or coupled to the first surface (or the lower surface) of the vibration layer 11. The first electrode layer 13 can have the same size as that of the vibration layer 11, or can have a size which is less than that of the vibration layer 11. For example, the first electrode layer 13 can be a lower electrode layer, a rear electrode layer, a rearmost electrode layer, or a lowermost electrode layer.

The second electrode layer 15 can be provided on or coupled to the second surface (or the upper surface) of the vibration layer 11. The second electrode layer 15 can have the same size as that of the vibration layer 11, or can have a size which is less than that of the vibration layer 11. For example, the second electrode layer 15 can have the same shape as that of the vibration layer 11, but embodiments of the present disclosure are not limited thereto. For example, the second electrode layer 15 can be an upper electrode layer, a front electrode layer, an uppermost electrode layer, or a frontmost electrode layer.

According to an embodiment of the present disclosure, each of the first electrode layer 13 and the second electrode layer 15 can be formed at the other portion, except an edge portion or a periphery portion, of the vibration layer 11 so as to prevent an electrical connection (or short circuit) between the first electrode layer 13 and the second electrode layer 15. For example, the first electrode layer 13 can be formed on the whole first surface, except the edge portion or the periphery portion, of the vibration layer 11. For example, the second electrode layer 15 can be formed on the whole second surface, except the edge portion or the periphery portion, of the vibration layer 11. For example, a distance between a lateral surface (or an outer sidewall) of the vibration layer 11 and a lateral surface (or an outer sidewall) of each of the first electrode layer 13 and the second electrode layer 15 can be at least 0.5 mm or more, but embodiments of the present disclosure are not limited thereto. For example, the distance between the lateral surface (or side surface) of the vibration layer 11 and the lateral surface (or side surface) of each of the first electrode layer 13 and the second electrode layer 15 can be at least 1 mm or more, but embodiments of the present disclosure are not limited thereto.

According to an embodiment of the present disclosure, one or more of the first electrode layer 13 and the second electrode layer 15 can include a transparent conductive material, a semitransparent conductive material, or an opaque conductive material. For example, the transparent or semitransparent conductive material of one or more of the first electrode layer 13 and the second electrode layer 15 can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or glass frit-containing silver (Ag), or an alloy thereof, but embodiments of the present disclosure are not limited thereto. For example, each of the first electrode layer 13 and the second electrode layer 15 can include silver (Ag) having a low resistivity, so as to enhance an electrical characteristic and/or a vibration characteristic of the vibration layer 11. For example, carbon can be a carbon material including carbon black, ketjen black, carbon nanotube, and graphite, but embodiments of the present disclosure are not limited thereto.

In the first electrode layer 13 and the second electrode layer 15 including glass frit-containing silver (Ag), a content of glass frit can be about 1 wt % to about 12 wt %, but embodiments of the present disclosure are not limited thereto. The glass frit can include a material based on PbO or $Bi_2O_3$, but embodiments of the present disclosure are not limited thereto.

The vibration layer 11 can be polarized (or poling) by a certain voltage applied to the first electrode layer 13 and the second electrode layer 15 in a certain temperature atmosphere or a temperature atmosphere which is changed from a high temperature to a room temperature, but embodiments of the present disclosure are not limited thereto. For example, the vibration layer 11 can alternately repeat contraction and/or expansion on the basis of an inverse piezoelectric effect based on a sound signal (or a voice signal) applied to the first electrode layer 13 and the second electrode layer 15 from the outside, and thus, can vibrate. For example, the vibration layer 11 can vibrate based on a vertical-direction vibration and a horizontal-direction vibration by using the first electrode layer 13 and the second electrode layer 15. Accordingly, the amount of displacement of the vibration portion 10 can increase or be enhanced based on the horizontal-direction contraction and/or expansion of the vibration layer 11.

The first cover member 30 can be disposed at the first surface 10*a* of the vibration generating portion 10 or a first surface of the vibration portion 10-1. For example, the first cover member 30 can be configured to cover the first surface of the vibration portion 10-1. For example, the first cover member 30 can be configured to cover the first electrode layer 13 of the vibration portion 10-1. Accordingly, the first cover member 30 can protect the first surface 10*a* of the vibration generating portion 10, or can protect the first surface of the vibration portion 10-1 or the first electrode layer 13 of the vibration portion 10-1.

The second cover member 50 can be disposed at the second surface 10*b* of the vibration generating portion 10 or a second surface of the vibration portion 10-1. For example, the second cover member 50 can be configured to cover the second surface 10*b* of the vibration generating portion 10 or the second surface of the vibration portion 10-1. For example, the second cover member 50 can be configured to cover the second electrode layer 15 of the vibration portion 10-1. Accordingly, the second cover member 50 can protect the second surface 10*b* of the vibration generating portion 10, or can protect the second surface of the vibration portion 10-1 or the second electrode layer 15 of the vibration portion 10-1.

Each of the first cover member 30 and the second cover member 50 according to an embodiment of the present disclosure can include one or more materials of plastic, fiber, cloth, paper, leather, rubber, and wood, but embodiments of the present disclosure are not limited thereto. For example, the first cover member 30 and the second cover member 50 can include the same material or different materials. For example, each of the first cover member 30 and the second cover member 50 can be a polyimide film or a polyethylene terephthalate film, but embodiments of the present disclosure are not limited thereto.

One or more of the first cover member 30 and the second cover member 50 according to an embodiment of the present disclosure can include an adhesive member. For example, one or more of the first cover member 30 and the second cover member 50 can include adhesive layers 41 and 42 coupled or adhered to the vibration generating portion 10. For example, the first cover member 30 can include the adhesive layer 41 coupled or adhered to the first surface 10*a* of the vibration generating portion 10 or the first surface of the vibration portion 10-1. For example, the second cover member 50 can include the adhesive layer 42 coupled or adhered to the second surface 10*b* of the vibration generating portion 10 or the second surface of the vibration portion 10-1.

The first cover member 30 can be connected or coupled to the first surface 10*a* of the vibration generating portion 10 or the first surface of the vibration portion 10-1 by using the first adhesive layer 41. For example, the first cover member 30 can be connected or coupled to the first surface 10*a* of the vibration generating portion 10 or the first surface of the vibration portion 10-1 through a film laminating process using the first adhesive layer 41.

The second cover member 50 can be connected or coupled to the second surface 10*b* of the vibration generating portion 10 or the second surface of the vibration portion 10-1 by using the second adhesive layer 42. For example, the second cover member 50 can be connected or coupled to the second surface 10*b* of the vibration generating portion 10 or the second electrode layer 15 of the vibration portion 10-1 through a film laminating process using the second adhesive layer 42.

The first adhesive layer 41 can be disposed or filled between the first cover member 30 and the first surface 10*a* of the vibration generating portion 10. The second adhesive layer 42 can be disposed or filled between the second cover member 50 and the second surface 10*b* of the vibration generating portion 10. Accordingly, the vibration generating portion 10 can be surrounded by the first adhesive layer 41 and the second adhesive layer 42. For example, the first adhesive layer 41 and the second adhesive layer 42 can configure one adhesive layer between the first cover member 30 and the second cover member 50, and thus, the vibration generating portion 10 can be embedded or buried in the first and second adhesive layers 41 and 42.

The first adhesive layer 41 and the second adhesive layer 42 according to an embodiment of the present disclosure can include an electrical insulation material which has adhesive properties and is capable of compression and decompression. For example, each of the first adhesive layer 41 and the second adhesive layer 42 can include epoxy resin, acrylic resin, silicone resin, and urethane resin, but embodiments of the present disclosure are not limited thereto.

The connection member 70 can connect the vibration generating portion 10 with the signal cable 90. The connection member 70 can be provided between the first cover member 30 and the second cover member 50. The connection member 70 can be provided between the first surface 10*a* of the vibration generating portion 10 and the first cover member 30. The connection member 70 can be provided on one surface of the vibration generating portion 10. The connection member 70 can be provided between the second surface 10*b* of the vibration generating portion 10 and the second cover member 50. The connection member 70 can connect the first electrode layer 13 of the vibration generating portion 10 with the second electrode layer 15 of the vibration generating portion 10.

Referring to FIGS. 2 and 3, the connection member 70 according to an embodiment of the present disclosure can include a first connection portion 71, a second connection portion 73, and a third connection portion 75.

The first connection portion 71 can be provided between the first electrode layer 13 and the first cover member 30, at one side of the vibration generating portion 10, and between the second electrode layer 15 and the second cover member 50. The first connection portion 71 can connect the first electrode layer 13 with a first signal line 93*a*. The first connection portion 71 can extend up to a second surface (or an upper surface) of the second electrode layer 15 along a lateral surface (or side surface) from a first surface (or a lower surface) of the first electrode layer 13.

The first connection portion 71 according to an embodiment of the present disclosure can have a line shape including a width parallel to a first direction X and a length parallel to a second direction Y intersecting with the first direction X. For example, the first direction X can be a short-side lengthwise direction, a widthwise direction, or a horizontal direction of the vibration generating portion 10 or the vibration portion 10-1, or can be an X-axis direction in an XYZ direction. For example, the second direction Y can be a long-side lengthwise direction, a lengthwise direction, or a vertical direction of the vibration generating portion 10 or the vibration portion 10-1, or can be a Y-axis direction in the XYZ direction.

According to an embodiment of the present disclosure, a width of the first connection portion 71 can be less than that of the vibration generating portion 10 or the vibration portion 10-1. For example, the width of the first connection portion 71 can be less than half of the width of the vibration generating portion 10 or the vibration portion 10-1.

According to an embodiment of the present disclosure, a length of the first connection portion 71 can be less than that of the vibration generating portion 10 or the vibration portion 10-1, but embodiments of the present disclosure are not limited thereto.

The first connection portion 71 can include a first conductive layer 71*a*, an insulation layer 71*b*, and a second conductive layer 71*c*. The first conductive layer 71*a* and the second conductive layer 71*c* can be disposed with the insulation layer 71*b* therebetween. The first conductive layer 71*a* and the second conductive layer 71*c* can include a conductive material which is good in electrical conductivity. For example, the first conductive layer 71*a* and the second conductive layer 71*c* can include copper (Cu), but embodiments of the present disclosure are not limited thereto. The insulation layer 71*b* can be provided between the first conductive layer 71*a* and the second conductive layer 71*c*. For example, the insulation layer 71*b* can be an insulation film, an insulation pad, a single-sided insulation tape, a double-sided insulation tape, a pad, an intermediate member, or an intermediate insulation pad, but embodiments of the present disclosure are not limited thereto. For example, the insulation layer 71*b* can be a polyimide film or a polyethylene terephthalate film, but embodiments of the present disclosure are not limited thereto. For example, the first connection portion 71 can have a clad structure where the first conductive layer 71*a* and the second conductive layer 71*c* are stacked with the insulation layer 71*b* therebetween, but embodiments of the present disclosure are not limited thereto. For example, the first connection portion 71 can have a flexible copper clad laminate structure, but embodiments of the present disclosure are not limited thereto.

The first connection portion 71 can include a first region 71-1 and a second region 71-2. The first region 71-1 can be a region, adjoining a first surface (or a lower surface) of the first electrode layer 13, of the first connection portion 71. The first region 71-1 can include a first conductive layer 71*a*, an insulation layer 71*b*, and a second conductive layer 71*c*. For example, a first hole H1 can be formed in the first region 71-1 of the first connection portion 71. The first hole H1 can be formed to pass through the first conductive layer 71*a*, the insulation layer 71*b*, and the second conductive layer 71*c*.

An adhesive 80 can be accommodated (or inserted or dotted) in the first hole H1. The adhesive 80 can be accommodated (or inserted or dotted) in the first hole H1 and can electrically connect the first conductive layer 71*a* with the second conductive layer 71*c*. The adhesive 80 can be accommodated (or inserted or dotted) in the first hole H1 and can attach the first region 71-1 to the first electrode layer 13. For example, the adhesive 80 can be a conductive adhesive. For example, the adhesive 80 can include silver (Ag), nickel (Ni), an Ag alloy, or a Ni alloy, but embodiments of the present disclosure are not limited thereto. For example, the first hole H1 can be a through hole, an electrical conduction hole, or a via hole, but embodiments of the present disclosure are not limited thereto. For example, the adhesive 80 can be cured for about 60 minutes at a temperature of about 150° C., but embodiments of the present disclosure are not limited thereto. Accordingly, a process on the adhesive 80 can be performed simultaneously with the insulation layer 71*b*. For example, a size of the first hole H1 can be about 500 μm to about 1000 μm, but embodiments of the present disclosure are not limited thereto. When a size of the first hole H1 is less than 500 μm, the adhesiveness of the adhesive 80 can decrease. For example, the first hole H1 can enhance an adhesive area of the adhesive 80 in manufacturing a sintered material of the vibration generating portion 10 or the vibration layer 11 of the vibration portion 10-1.

In an embodiment of the present disclosure, the first hole H1 can be formed and the adhesive 80 can be accommodated (or inserted or dotted) in the first hole H1, and thus, can connect the first conductive layer 71*a* with the second conductive layer 71*c*. In an embodiment of the present disclosure, the first hole H1 can be formed and the adhesive 80 can be accommodated (or inserted or dotted) in the first hole H1, and thus, can attach the first connection portion 71 to the first electrode layer 13 without an increase in thickness of a vibration apparatus.

Referring to FIGS. 2, 3, and 5, the second region 71-2 can be a region which is bent toward the second cover member 50 from the first region 71-1 and adjoins a second surface (or an upper surface) of the second electrode layer 15. The second region 71-2 can include an insulation layer 71*b* and a second conductive layer 71*c*.

The insulation layer 71*b* provided in the second region 71-2 of the first connection portion 71 can attach the second surface (or the upper surface) of the second electrode layer 15. The second conductive layer 71*c* can be provided on the insulation layer 71*b*. The insulation layer 71*b* provided in the second region 71-2 can insulate the first conductive layer 71*a* and the second conductive layer 71*c*, provided in the first connection portion 71, from the second electrode layer 15 of the vibration generating portion 10. The insulation layer 71*b* can insulate the first conductive layer 71*a* and the second conductive layer 71*c* of the first region 71-1, and the second conductive layer 71*c* of the second region 71-2 from the second electrode layer 15. For example, an adhesive member can be additionally provided between the second conductive layer 71*c* provided in the second region 71-2 and the second surface (or the upper surface) of the second electrode layer 15. The adhesive member can be an insulation tape, but embodiments of the present disclosure are not limited thereto. The second region 71-2 can be connected with the first signal line 93. The second conductive layer 71*c* provided in the second region 71-2 can be electrically connected with the first signal line 93.

According to an embodiment of the present disclosure, the first conductive layer 71*a* and the second conductive layer 71*c* provided in the first region 71-1 of the first connection portion 71 can be connected with a lower surface of the first electrode layer 13 by the first hole H1 and the adhesive 80. Further, the insulation layer 71*b* provided in the second region 71-2 of the first connection portion 71 can be connected with the upper surface of the second electrode layer 15. Accordingly, the first conductive layer 71*a* and the second conductive layer 71*c* connected with the first electrode layer 13 can be insulated from the second electrode layer 15 by the insulation layer 71*b* provided in the second region 71-2.

According to an embodiment of the present disclosure, the first electrode layer 13 can be connected with the first connection portion 71, and the first electrode layer 13 can be insulated from the second electrode layer 15 by the insulation layer 71*b*, and thus, the first connection portion 71 can be disposed on the second electrode layer 15. Accordingly, in an embodiment of the present disclosure, the first signal line 93 connected with the first electrode layer 13 can be provided between the second electrode layer 15 and the second cover member 50.

Referring to FIGS. 2, 3, and 4, the second connection portion 73 can be provided between the second electrode layer 15 and the second cover member 50. The second connection portion 73 can connect the second electrode layer 15 with the second signal line 95. The second connection portion 73 can be provided at the second surface (or the upper surface) of the second electrode layer 15. The second connection portion 73 can contact the second signal line 95 at the second surface (or the upper surface) of the second electrode layer 15.

The second connection portion 73 can have a line shape which has a certain thickness (or height), a width parallel to a first direction X, and a length parallel to a second direction Y intersecting with the first direction X. The second connection portion 73 can not overlap the first connection portion 71. The second connection portion 73 can be arranged in the first direction X in parallel with the first connection portion 71. The second connection portion 73 can be spaced apart from the first connection portion 71 by a certain interval in the first direction X. The second connection portion 73 may not contact the first connection portion 71. For example, the second connection portion 73 can have a length which differs from or is equal to that of the first connection portion 71.

The second connection portion 73 can include a first conductive layer 73*a*, an insulation layer 73*b*, and a second conductive layer 73*c*. The first conductive layer 73*a* and the second conductive layer 73*c* can be disposed with the insulation layer 73*b* therebetween. The first conductive layer 73*a* and the second conductive layer 73*c* can include a conductive material which is good in electrical conductivity. For example, the first conductive layer 73*a* and the second conductive layer 73*c* can include copper (Cu), but embodiments of the present disclosure are not limited thereto. The insulation layer 73*b* can be provided between the first conductive layer 73*a* and the second conductive layer 73*c*. For example, the first conductive layer 71*a* and the second conductive layer 71*c* of the first connection portion 71 may not contact the first conductive layer 73*a* and the second conductive layer 73*c* of the second connection portion 73. The first conductive layer 71*a* and the second conductive layer 71*c* of the first connection portion 71 can be spaced apart from the first conductive layer 73*a* and the second conductive layer 73*c* of the second connection portion 73 with the third connection portion 75 therebetween. For example, the insulation layer 71*b* of the first connection portion 71 can be connected with the insulation layer 73*b* of the second connection portion 73 by the third connection portion 75. For example, the insulation layer 73*b* can be an insulation film, an insulation pad, a single-sided insulation tape, a double-sided insulation tape, a pad, an intermediate member, or an intermediate insulation pad, but embodiments of the present disclosure are not limited thereto. For example, the insulation layer 73*b* can be a polyimide film or a polyethylene terephthalate film, but embodiments of the present disclosure are not limited thereto. For example, the second connection portion 73 can have a clad structure where the first conductive layer 73*a* and the second conductive layer 73*c* are stacked with the insulation layer 73*b* therebetween, but embodiments of the present disclosure are not limited thereto. For example, the second connection portion 73 can have a flexible copper clad laminate structure, but embodiments of the present disclosure are not limited thereto.

The second connection portion 73 can include a second hole H2. The second hole H2 can be formed to face the second surface (or the upper surface) of the second electrode layer 15. The second hole H2 can be formed to pass through the first conductive layer 73*a*, the insulation layer 73*b*, and the second conductive layer 73*c* of the second connection portion 73.

The adhesive 80 can be accommodated (or inserted or dotted) in the second hole H2. The adhesive 80 can be accommodated (or inserted or dotted) in the second hole H2 and can electrically connect the first conductive layer 73*a* with the second conductive layer 73*c*. The adhesive 80 can be accommodated (or inserted or dotted) in the second hole H2 and can attach the second connection portion 73 to the second electrode layer 15. The adhesive 80 can electrically connect the second connection portion 73 with the second electrode layer 15. For example, the adhesive 80 can be a conductive adhesive. For example, the adhesive 80 can include silver (Ag), nickel (Ni), an Ag alloy, or a Ni alloy, but embodiments of the present disclosure are not limited thereto. For example, the second hole H2 can be a through hole, an electrical conduction hole, or a via hole, but embodiments of the present disclosure are not limited thereto. For example, the second hole H2 can enhance an adhesive area of the adhesive 80 in manufacturing a sintered material of the vibration layer 11.

In an embodiment of the present disclosure, the second hole H2 can be formed and the adhesive 80 can be accommodated (or inserted or dotted) in the second hole H2, and thus, can be electrically connected the first conductive layer 73*a* with the second conductive layer 73*c*. In an embodiment of the present disclosure, the second hole H2 can be formed and the adhesive 80 can be accommodated (or inserted) in the second hole H2, and thus, can attach the second connection portion 73 to the second electrode layer 15 without an increase in thickness of a vibration apparatus. The second connection portion 73 can be connected with the second signal line 95*a*, on the second electrode layer 15.

The third connection portion 75 can be connected or disposed between the first connection portion 71 and the second connection portion 73. The third connection portion 75 can be provided on the second electrode layer 15. The third connection portion 75 can connect the insulation layer 71*b* of the first connection portion 71 and the insulation layer 73*b* of the second connection portion 73. The third connection portion 75 can include the same material as that of the insulation layer 71*b* of the first connection portion 71 and the insulation layer 73*b* of the second connection portion 73. For example, the third connection portion 75 can be an insulation film, an insulation pad, a single-sided insulation tape, a double-sided insulation tape, a pad, an intermediate member, or an intermediate insulation pad, but embodiments of the present disclosure are not limited thereto.

The first to third connection portions 71, 73, and 75 of the connection member 70 can be covered by the adhesive layers 41 and 42, between the first cover member 30 and the second cover member 50.

The signal cable 90 can be electrically connected with the vibration generating portion 10 (or the vibration portion 10-1), between the second surface 10*b* of the vibration generating portion 10 and the second cover member 50. For example, the signal cable 90 can be electrically connected with the connection member 70 which is in the second surface 10*b* of the vibration generating portion 10. For example, the signal cable 90 can be disposed between the second surface 10*b* of the vibration generating portion 10 and the second cover member 50 and can be connected with the vibration generating portion 10 by the connection member 70. For example, the signal cable 90 can be electrically connected with the first connection portion 71 and the second connection portion 73 electrically connected with the vibration portion 10-1 at the second surface 10*b* of the vibration generating portion 10. For example, the signal cable 90 can be configured to supply different driving signals to the first connection portion 71 and the second connection portion 73 connected with the vibration generating portion 10. For example, the signal cable 90 can be configured to supply the different driving signals to the first electrode layer 13 and the second electrode layer 15 of the vibration portion 10-1. For example, the signal cable 90 can be configured as a power supply member, a signal cable, a flexible cable, a flexible printed circuit cable, a flexible flat cable, a single-sided flexible printed circuit, a single-sided flexible printed circuit board (PCB), a flexible multilayer printed circuit, or a flexible multilayer PCB, but embodiments of the present disclosure are not limited thereto.

Referring to FIGS. 1, 2, 4, and 5, the signal cable 90 according to an embodiment of the present disclosure can include a base member 91, a first signal line 93, and a second signal line 95. For example, the first signal line 93 can be electrically connected with a lower electrode layer (or the first electrode layer 13 of the vibration portion 10-1) of the vibration generating portion 10. The first signal line 93 can be electrically connected with the lower electrode layer (or the first electrode layer 13 of the vibration portion 10-1) by the first connection portion 71 of the connection member 70. For example, the second signal line 95 can be electrically connected with an upper electrode layer (or the second electrode layer 15 of the vibration portion 10-1) of the vibration generating portion 10. The second signal line 95 can be electrically connected with the upper electrode layer (or the second electrode layer 15 of the vibration portion 10-1) by the second connection portion 73 of the connection member 70.

Referring to FIGS. 2, 4, and 5, the base member 91 can include a transparent or opaque plastic material. For example, the base member 91 can include one or more of resins such as fluorine resin, polyimide-based resin, polyurethane-based resin, polyester-based resin, polyethylene-based resin, and polypropylene-based resin, but embodiments of the present disclosure are not limited thereto. The base member 91 can be a base film or a base insulation film, but embodiments of the present disclosure are not limited thereto.

The base member 91 can have a certain width in the first direction X and can extend lengthwise along the second direction Y intersecting with the first direction X.

The first signal line 93 can be disposed at a first surface (or a rear surface) of the base member 91. For example, the first signal line 93 can be disposed at the first surface (or the rear surface) of the base member 91 in parallel with the second direction Y. The second signal line 95 can be disposed at the first surface (or the rear surface) of the base member 91. For example, the second signal line 95 can be disposed at the first surface (or the rear surface) of the base member 91 in parallel with the second direction Y and can be spaced apart from the first signal line 93. The first and second signal lines 93 and 95 can be arranged in parallel at the first surface of the base member 91. For example, each of the first and second signal lines 93 and 95 can be implemented in a line shape by patterning of a metal layer (or a conductive layer) which is formed or deposited at the first surface of the base member 91.

End portions (or distal end portions or one portion) 93*a* and 95*a* of the first signal line 93 and the second signal line 95 of the signal cable 90 can be electrically connected with the vibration generating portion 10 in the same direction. For example, each of the end portions 93*a* and 95*a* of the first signal line 93 and the second signal line 95 of the signal cable 90 can be electrically connected with the vibration generating portion 10 with being arranged toward the second surface 10*b* (or an upper electrode layer) of the vibration generating portion 10.

According to an embodiment of the present disclosure, the end portions 93*a* and 95*a* of the first signal line 93 and the second signal line 95 of the signal cable 90 can be electrically connected with the first connection portion 71 and the second connection portion 73 provided in the second electrode layer 15 of the vibration generating portion 10 or the vibration portion 10-1, respectively.

The end portion 93*a* of the first signal line 93 can be electrically connected with the first connection portion 71 connected with the first electrode layer 13, between the second surface 10*b* of the vibration generating portion 10 and the second cover member 50. The end portion 93*a* of the first signal line 93 can be electrically connected with the second conductive layer 71*c* of the first connection portion 71 connected with the first electrode layer 13. The end portion 93*a* of the first signal line 93 can be electrically connected with the second conductive layer 71*c* of the first connection portion 71. The end portion 93*a* of the first signal line 93 can be electrically connected with the first conductive layer 71*a* and the second conductive layer 71*c* of the first connection portion 71 connected with the first electrode layer 13. Accordingly, a driving signal (or a first driving signal) supplied from a vibration driving circuit can be supplied to the first electrode layer 13 of the vibration generating portion 10 through the first signal line 93.

The end portion 95*a* of the second signal line 95 can be electrically connected with the connection member 70 provided on the second surface 10*b* of the vibration generating portion 10, between the second surface 10*b* of the vibration generating portion 10 and the second cover member 50. For example, the end portion 95*a* of the second signal line 95 can be electrically connected with or contact the second connection portion 73 provided at the second surface 10*b* of the vibration generating portion 10. For example, the end portion 95*a* of the second signal line 95 can be electrically connected with the first conductive layer 73*a* and the second conductive layer 73*c* provided in the second connection portion 73. For example, the end portion 95*a* of the second signal line 95 can be electrically connected with the second electrode layer 15 of the vibration generating portion 10 through the first conductive layer 73*a* and the second conductive layer 73*b* of the second connection portion 73, and the adhesive 80. Accordingly, a driving signal (or a second driving signal) supplied from the vibration driving circuit can be supplied to the second electrode layer 15 of the vibration generating portion 10 through the second signal line 95 and the second connection portion 73.

The signal cable 90 according to an embodiment of the present disclosure can further include an insulation layer 97.

The insulation layer 97 can be disposed at a first surface (or a lower surface) of the base member 91 to cover each of the first signal line 93 and the second signal line 95 except the end portion (or the one side) of the signal cable 90. The insulation layer 97 can be a passivation layer, a protection layer, a cover lay, a cover-lay film, a cover film, or a cover insulation film, but embodiments of the present disclosure are not limited thereto.

The end portion (or one portion) of the signal cable 90 including the end portion 91*a* (or one portion) of the base member 91 illustrated by a dotted line in FIGS. 3 to 5 can be accommodated (or inserted) between the second surface 10*b* of the vibration generating portion 10 and the second cover member 50 and can be accommodated (or inserted) and fixed between the second surface 10*b* of the vibration generating portion 10 and the second cover member 50 by using a second adhesive layer 42 formed in the second cover member 50. For example, the end portion (or one side) of the signal cable 90 accommodated (or inserted) between the second surface 10*b* of the vibration generating portion 10 and the second cover member 50 can be accommodated (or inserted) and fixed between the second surface 10*b* of the vibration generating portion 10 and the second cover member 50 by a film laminating process using the second adhesive layer 42 formed in the second cover member 50 and the first adhesive layer 41 formed in the first cover member 30. Therefore, an end portion 93*a* (or one portion) of the first signal line 93 can be maintained with being electrically connected with the first connection portion 71 connected with the first electrode layer 13 of the vibration generating portion 10. Accordingly, an end portion 95*a* (or one portion) of the second signal line 95 can be maintained with being electrically connected with the second connection portion 73 connected with the second electrode layer 15 of the vibration generating portion 10. Further, the end portion (or one portion) of the signal cable 90 can be accommodated (or inserted) and fixed between the second surface 10*b* of the vibration generating portion 10 and the second cover member 50, and thus, a connection defect between the vibration generating portion 10 and the signal cable 90 caused by the movement of the signal cable 90 can be prevented.

In the signal cable 90 according to an embodiment of the present disclosure, the end portion 91*a* (or one portion) of the base member 91 illustrated by a dotted line in FIGS. 3 to 5 can be removed. For example, each of the end portion 93*a* of the first signal line 93 and the end portion 95*a* of the second signal line 95 may not be supported or covered by the end portion 91*a* of the base member 91 and can be exposed to the outside. For example, each of the end portion 93*a* of the first signal line 93 and the end portion 95*a* of the second signal line 95 can protrude to have a certain length from the end portion 91*a* of the base member 91. Accordingly, each of the end portion 93*a* of the first signal line 93 and the end portion 95*a* of the second signal line 95 can be individually or independently bent.

The end portion 93*a* of the first signal line 93 which is not supported by the base member 91 can be a first protrusion line, a first protrusion electrode, a first conductive line, a first conductive protrusion line, a first conductive wire, a first flexible protrusion line, a first flexible protrusion electrode, a first flexible conductive line, a first flexible conductive protrusion line, or a first flexible conductive wire. For example, the end portion 95*a* of the second signal line 95 which is not supported by the base member 91 can be a second protrusion line, a second protrusion electrode, a second conductive line, a second conductive protrusion line, a second conductive wire, a second flexible protrusion line, a second flexible protrusion electrode, a second flexible conductive line, a second flexible conductive protrusion line, or a second flexible conductive wire. Accordingly, the signal cable 90 according to another embodiment of the present disclosure can include a base member 91, first and second signal lines 93 and 95, first and second conductive protrusion lines 93*a* and 95*a*, and an insulation layer 97.

Each of the first and second signal lines 93 and 95 can be disposed between only the base film 91 and the insulation layer 97.

Each of the first and second conductive protrusion lines 93*a* and 95*a* can extend to pass through an end 91*e* of the base member 91 from each of the first and second signal lines 93 and 95. Each of the first and second conductive protrusion lines 93*a* and 95*a* can be disposed and inserted (or accommodated) between the second surface 10*b* of the vibration generating portion 10 and the second cover member 50. The first conductive protrusion line 93*a* can be electrically connected with the lower electrode layer of the vibration generating portion 10 (or the first electrode layer 13 of the vibration portion 10-1) by the first connection portion 71, between the second surface 10*b* of the vibration generating portion 10 and the second cover member 50. The second conductive protrusion line 95*a* can be electrically connected with the upper electrode layer of the vibration generating portion 10 (or the second electrode layer 15 of the vibration portion 10-1) by the second connection portion 73, between the second surface 10*b* of the vibration generating portion 10 and the second cover member 50.

According to an embodiment of the present disclosure, a portion of the signal cable 90 can be disposed or inserted (or accommodated) between the second surface 10*b* of the vibration generating portion 10 and the second cover member 50, and thus, the signal cable 90 can be provided as one body with the vibration generating portion 10, whereby the signal cable 90 and the vibration generating portion 10 can be configured as one part. For example, the vibration apparatus 1 according to an embodiment of the present disclosure can be a vibration apparatus integrated with the signal cable 90.

In the vibration apparatus 1 according to an embodiment of the present disclosure, the first and second signal lines 93 and 95 of the signal cable 90 can be provided as one body with the vibration generating portion 10, and thus, a soldering process for an electrical connection between the vibration generating portion 10 and the signal cable 90 may not be needed, thereby simplifying a manufacturing process and a structure of the vibration apparatus 1. Further, the first and second signal lines 93 and 95 of the signal cable 90 can be electrically connected with the vibration generating portion 10 in the same direction, and thus, a manufacturing process and a structure of the signal cable 90 can be simplified.

In the vibration apparatus 1 according to an embodiment of the present disclosure, because the first and second signal lines 93 and 95 of the signal cable 90 are disposed between the second surface 10*b* of the vibration generating portion 10 and the second cover member 50, a step height (or a height difference) between the first and second signal lines 93 and 95 can decrease, and thus, the occurrence of a crack or damage of the vibration generating portion 10 can be prevented or minimized in a film laminating process, thereby increasing the reliability of the vibration apparatus 1.

For example, a crack or damage of a vibration generating portion may occur due to the step height between first and second signal lines, and due to the crack or damage of the vibration generating portion, a polarization (or poling) of a first electrode layer and a second electrode layer may be difficult. However, according to an embodiment of the present disclosure, the step height (or the height difference) between the first and second signal lines can decrease, and thus, the occurrence of the crack or damage of the vibration generating portion 10 can be prevented in a film laminating process, thereby increasing the reliability of the vibration apparatus 1. Accordingly, an issue where the polarization (or poling) of the first electrode layer and the second electrode layer may be difficult can be solved or addressed, thereby increasing the reliability of the vibration apparatus 1.

According to an embodiment of the present disclosure, a thickness of a vibration apparatus can decrease, and thus, a weight can be reduced, thereby implementing a vibration apparatus which is lightweight. Further, according to an embodiment of the present disclosure, a defect such as a crack of a vibration apparatus can be prevented or minimized, and thus, a yield ratio can be enhanced, thereby implementing process optimization by reducing production energy. Further, according to an embodiment of the present disclosure, a manufacturing process can be simplified, and thus, process optimization can be realized by reducing production energy.

Figure 7:
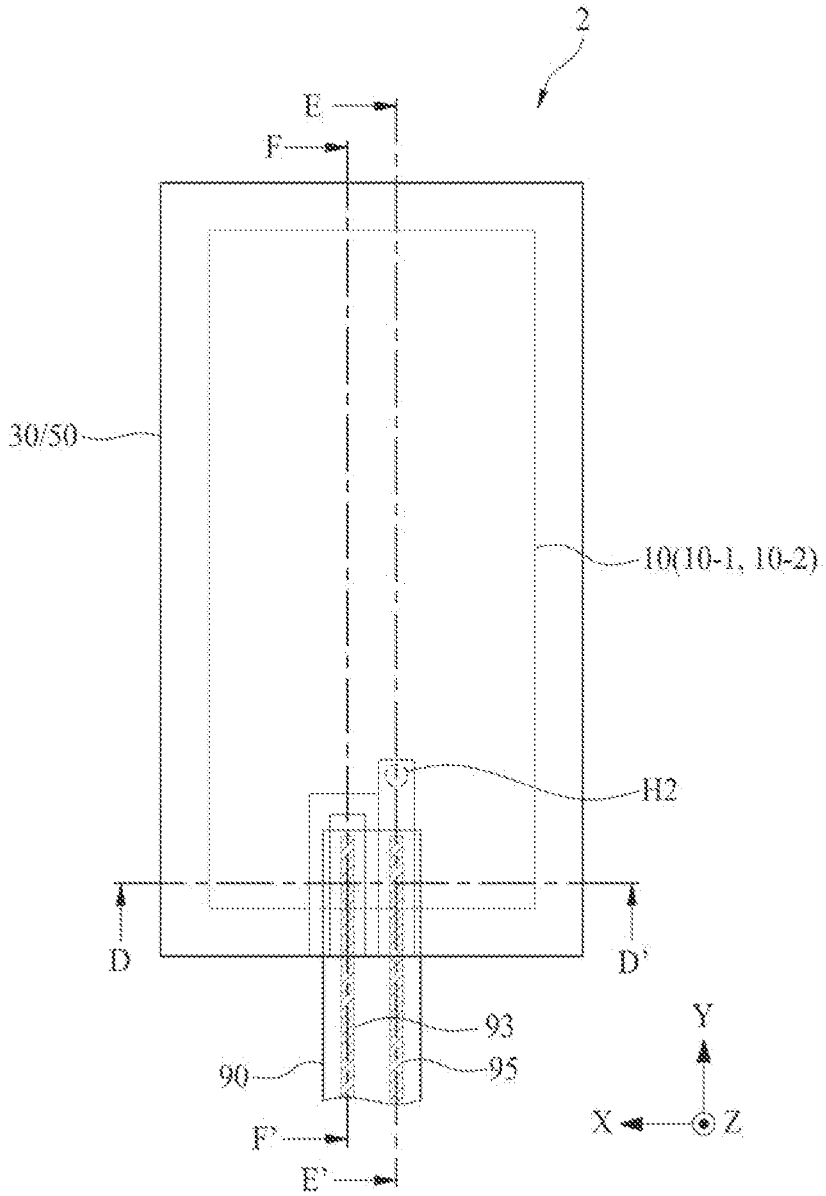
FIG. 7 illustrates a vibration apparatus according to another embodiment of the present disclosure.
Figure 8:
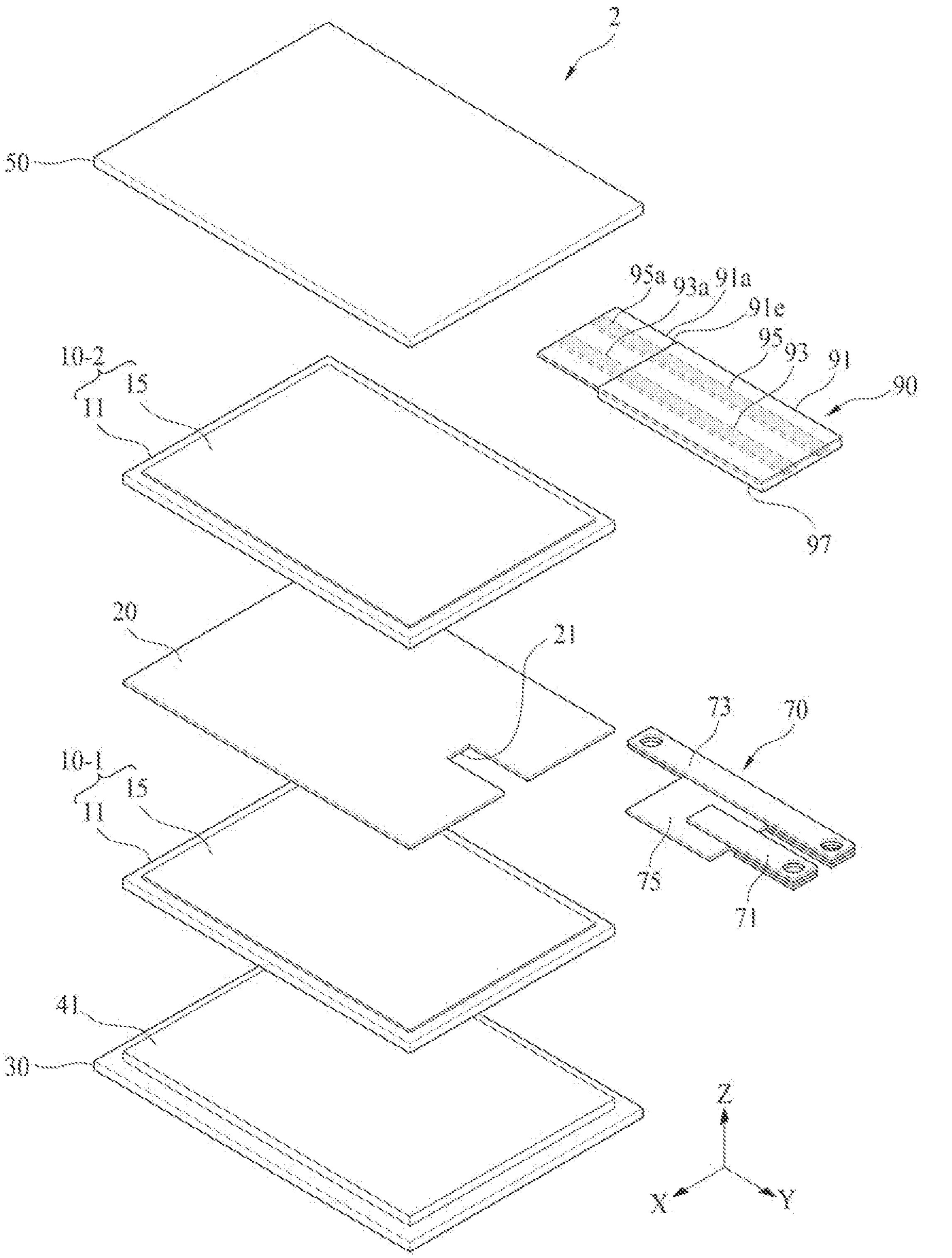
FIG. 8 is an exploded perspective view of the vibration apparatus illustrated in FIG. 7 according to another embodiment of the present disclosure.
Figure 9:
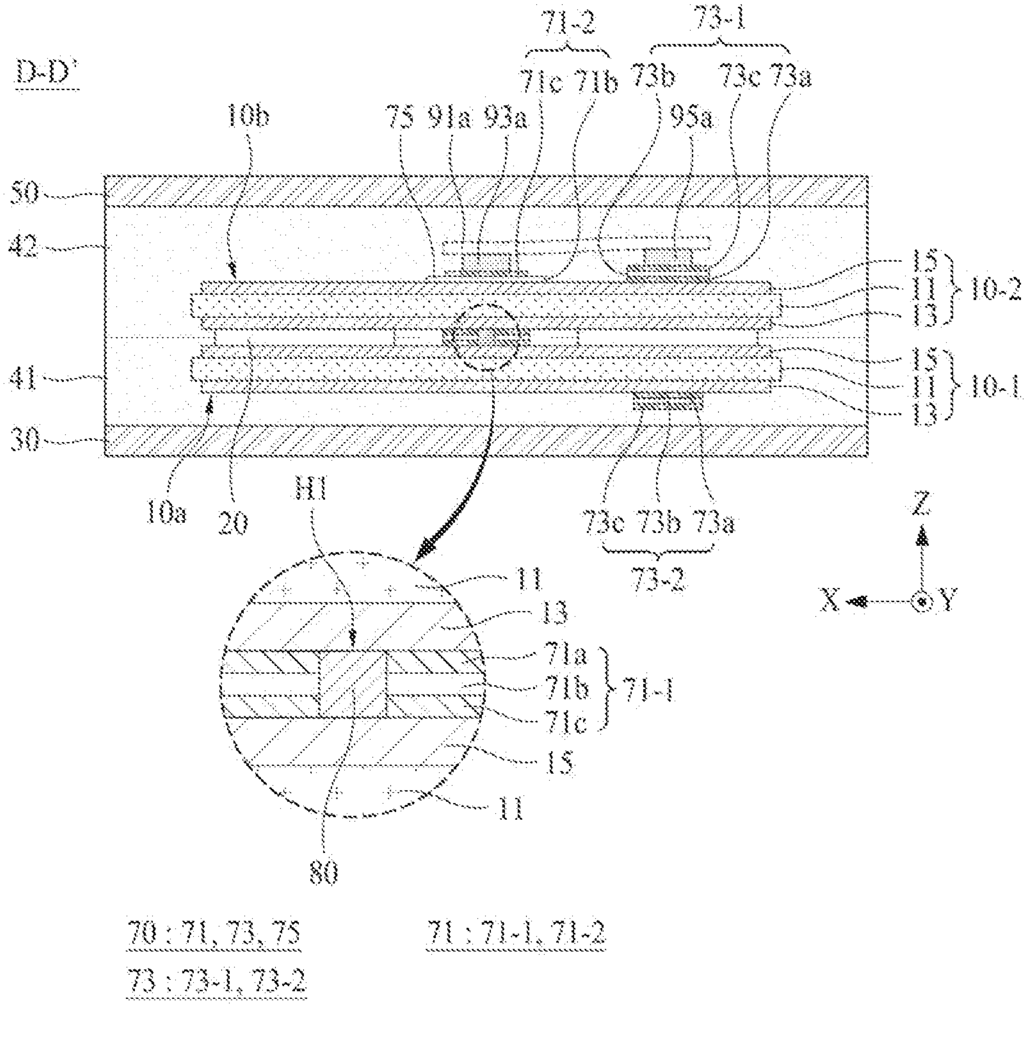
FIG. 9 is a cross-sectional view taken along line D-D' illustrated in FIG. 7 according to another embodiment of the present disclosure.
Figure 10:
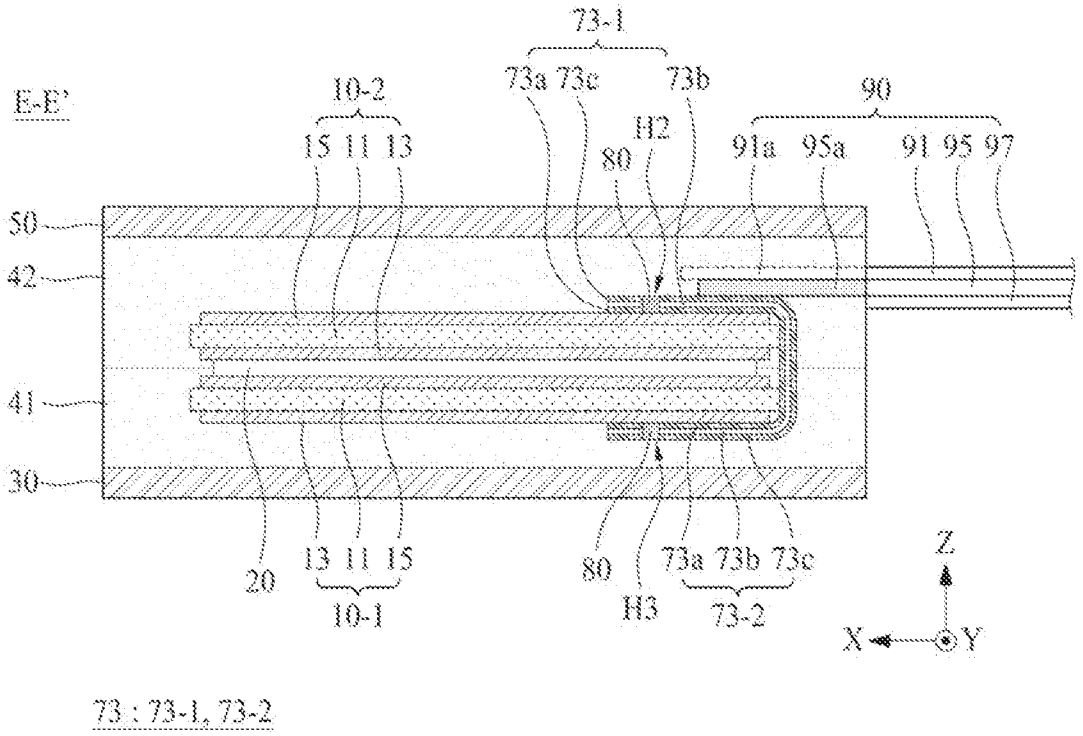
FIG. 10 is a cross-sectional view taken along line E-E' illustrated in FIG. 7 according to another embodiment of the present disclosure.
Figure 11:
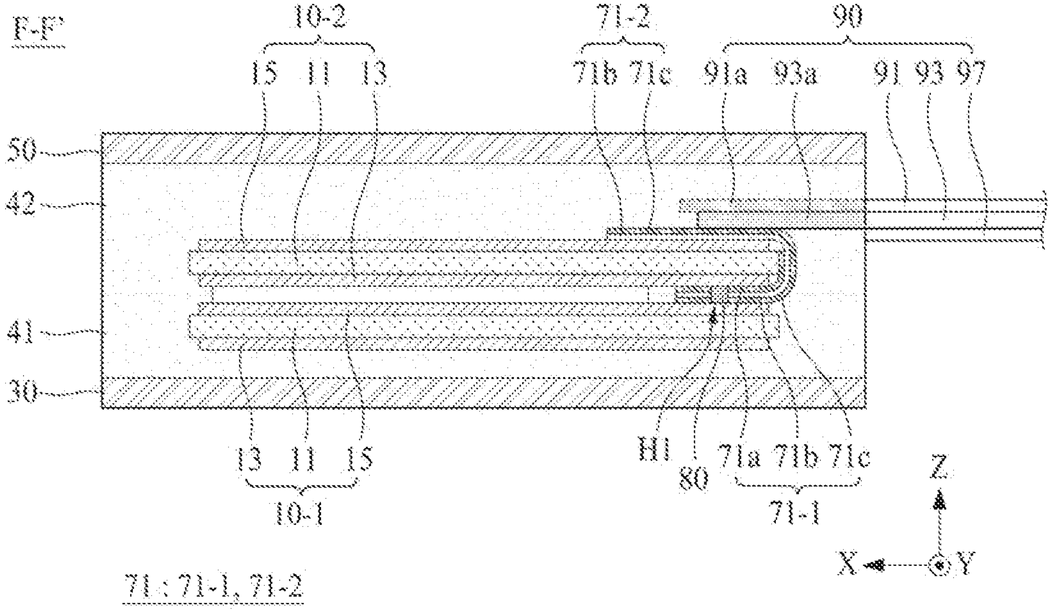
FIG. 11 is a cross-sectional view taken along line F-F' illustrated in FIG. 7 according to another embodiment of the present disclosure.
Figure 12:
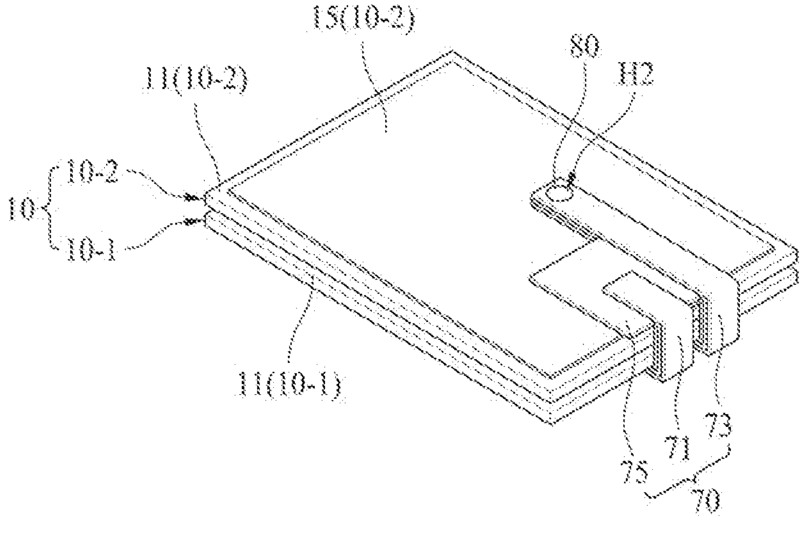
FIG. 12 is a perspective view illustrating an arrangement structure between a vibration generating portion and a connection member illustrated in FIG. 7 according to another embodiment of the present disclosure.

FIG. 7 illustrates a vibration apparatus according to another embodiment of the present disclosure. FIG. 8 is an exploded perspective view of the vibration apparatus illustrated in FIG. 7 according to another embodiment of the present disclosure. FIG. 9 is a cross-sectional view taken along line D-D' illustrated in FIG. 7 according to another embodiment of the present disclosure. FIG. 10 is a cross-sectional view taken along line E-E' illustrated in FIG. 7 according to another embodiment of the present disclosure. FIG. 11 is a cross-sectional view taken along line F-F' illustrated in FIG. 7 according to another embodiment of the present disclosure. FIG. 12 is a perspective view illustrating an arrangement structure between a vibration generating portion and a connection member illustrated in FIG. 7 according to another embodiment of the present disclosure. Except for that a vibration apparatus according to another embodiment of the present disclosure includes two vibration portions and a connection member is connected with the two vibration portions, the vibration apparatus according to another embodiment of the present disclosure can be the same or substantially the same as the vibration apparatus according to an embodiment of the present disclosure or according to the embodiments discussed in FIGS. 1-6. Hereinafter, therefore, different elements will be described.

Referring to FIGS. 7 to 12, a vibration apparatus 2 according to another embodiment of the present disclosure can include a vibration generating portion 10, an intermediate member 20, a first cover member 30, a second cover member 50, a connection member 70, and a signal cable 90.

The vibration generating portion 10 can be configured to vibrate based on a driving signal (or a sound signal or a voice signal) supplied through the signal cable 90. For example, the vibration generating portion 10 can include a first surface 10*a* and a second surface 10*b* opposite to the first surface 10*a*.

The vibration generating portion 10 can include a plurality of vibration portions 10-1 and 10-2 which overlap or overlay each other. For example, the vibration portion 10 can include a plurality of vibration portions 10-1 and 10-2 which overlap each other or are stacked. For example, the first surface 10*a* of the vibration generating portion 10 can be a first surface (or a lower surface) of the first vibration portion 10-1, and the second surface 10*b* of the vibration generating portion 10 can be a second surface (or an upper surface) of the second vibration portion 10-2.

Each of the first and second vibration portions (or the plurality of vibration portions) 10-1 and 10-2 according to an embodiment of the present disclosure can include a vibration layer 11, a first electrode layer 13, and a second electrode layer 15. The vibration layer 11, the first electrode layer 13, and the second electrode layer 15 of each of the first and second vibration portions (or the plurality of vibration portions) 10-1 and 10-2 can be substantially the same as the vibration layer 11, the first electrode layer 13, and the second electrode layer 15 of the vibration generating portion 10 described above with reference to FIGS. 1 to 6, and thus, repetitive descriptions thereof are omitted or will be briefly given.

The first electrode layer 13 of the first vibration portion 10-1 can be a first surface 10*a* or a lower electrode layer of the vibration generating portion 10. The second electrode layer 15 of the first vibration portion 10-1 can be disposed under the first electrode layer 13 of the second vibration portion 10-2. The first electrode layer 13 of the second vibration portion 10-2 can be disposed on the second electrode layer 15 of the first vibration portion 10-1. The second electrode layer 15 of the second vibration portion 10-2 can be a second surface 10*b* or an upper electrode layer of the vibration generating portion 10. Each of the second electrode layer 15 of the first vibration portion 10-1 and the first electrode layer 13 of the second vibration portion 10-2 can be an internal electrode layer, a middle electrode layer, an intermediate electrode layer, or a common electrode layer of the vibration generating portion 10, but embodiments of the present disclosure are not limited thereto.

The vibration layer 11 of the first vibration portion 10-1 and the vibration layer 11 of the second vibration portion 10-2 can be polarized (or poling) in the same direction, or can be polarized (or poling) in directions opposite to each other. For example, a polarization direction (or a poling direction) formed in the vibration layer 11 of the first vibration portion 10-1 can be a direction opposite to a polarization direction (or a poling direction) formed in the vibration layer 11 of the second vibration portion 10-2. According to an embodiment of the present disclosure, when the polarization direction (or the poling direction) formed in the vibration layer 11 of the first vibration portion 10-1 is a direction opposite to the polarization direction (or the poling direction) formed in the vibration layer 11 of the second vibration portion 10-2, the first vibration portion 10-1 and the second vibration portion 10-2 can be displaced (or vibrated or driven) in the same direction, and thus, a vibration width (or a displacement width or a driving width) of the vibration generating portion 10 can be maximized, thereby enhancing a sound pressure level.

The first cover member 30 can be configured to cover the first surface 10*a* (or the lower electrode layer) of the vibration generating portion 10 or the first electrode layer 13 of the first vibration portion 10-1. The first cover member 30 can be connected or coupled to the first surface 10*a* (or the lower electrode layer) of the vibration generating portion 10 or the first electrode layer 13 of the first vibration portion 10-1 by a first adhesive layer 41. Except for that the first cover member 30 is configured to cover the first surface 10*a* of the vibration generating portion 10 or the first electrode layer 13 of the first vibration portion 10-1, the first cover member 30 can be substantially the same as the first cover member 30 described above with reference to FIGS. 1 to 6, and thus, repetitive descriptions thereof are omitted.

The second cover member 50 can be configured to cover the second surface 10*b* (or the upper electrode layer) of the vibration generating portion 10 or the second electrode layer 15 of the second vibration portion 10-2. The second cover member 50 can be connected or coupled to the second surface 10*b* (or the upper electrode layer) of the vibration generating portion 10 or the second electrode layer 15 of the second vibration portion 10-2 by a second adhesive layer 42. Except for that the second cover member 50 is configured to cover the second surface 10*b* of the vibration generating portion 10 or the second electrode layer 15 of the second vibration portion 10-2, the second cover member 50 can be substantially the same as the second cover member 50 described above with reference to FIGS. 1 to 6, and thus, repetitive descriptions thereof are omitted.

The first adhesive layer 41 can be disposed or filled between the first cover member 30 and the first surface 10*a* of the vibration generating portion 10. The second adhesive layer 42 can be disposed or filled between the second cover member 50 and the second surface 10*b* of the vibration generating portion 10. Accordingly, the vibration generating portion 10 can be surrounded by the first adhesive layer 41 and the second adhesive layer 42. For example, the first adhesive layer 41 and the second adhesive layer 42 can configure one adhesive layer between the first cover member 30 and the second cover member 50, and thus, the vibration generating portion 10 can be embedded or buried in the first and second adhesive layers 41 and 42.

The intermediate member 20 can be provided between the first vibration portion 10-1 and the second vibration portion 10-2. The intermediate member 20 can insulate the first vibration portion 10-1 from the second vibration portion 10-2, between the first vibration portion 10-1 and the second vibration portion 10-2. The intermediate member 20 can be provided between the second electrode layer 15 of the first vibration portion 10-1 and the first electrode layer 13 of the second vibration portion 10-2. For example, the intermediate member 20 can include an insulation material, but embodiments of the present disclosure are not limited thereto.

For example, the intermediate member 20 can be a thermo-curable insulation film, but embodiments of the present disclosure are not limited thereto. For example, a thickness of the intermediate member 20 can be about 50 μm, but embodiments of the present disclosure are not limited thereto. According to an embodiment of the present disclosure, the thermos-curable insulation film can configure the intermediate member 20, and thus, the manufacturing cost can be reduced compared to an intermediate member including silver (Ag) and/or palladium (Pd).

A concave portion 21 which is provided to be concave toward the other portion thereof from one portion thereof can be provided in one end portion (or one portion) of the intermediate member 20. Because the concave portion 21 is provided, a partial region (or some region) of the second electrode layer 15 of the first vibration portion 10-1 and a partial region (or some region) of the first electrode layer 13 of the second vibration portion 10-2 facing each other can be exposed. Because the concave portion 21 is provided, the intermediate member 20 may not be provided in a partial region (or some region) of the second electrode layer 15 of the first vibration portion 10-1 and a partial region (or some region) of the first electrode layer 13 of the second vibration portion 10-2 facing each other.

The concave portion 21 can be disposed in the first region 71-1 of the first connection portion 71. Therefore, the second electrode layer 15 of the first vibration portion 10-1 can be electrically connected with the first electrode layer 13 of the second vibration portion 10-2 through the first connection portion 71. Accordingly, the first connection portion 71 can easily contact the second electrode layer 15 of the first vibration portion 10-1 and the first electrode layer 13 of the second vibration portion 10-2.

The connection member 70 according to an embodiment of the present disclosure can be a double-sided copper film or a double-sided copper clad laminate film. Accordingly, the connection member 70 can have a structure where copper (Cu) is included in each of a first surface (or a lower surface) and a second surface (or an upper surface) of an insulation layer with the insulation layer therebetween.

The connection member 70 according to another embodiment of the present disclosure can include a first connection portion 71, a second connection portion 73, and a third connection portion 75.

The first connection portion 71 can include a first conductive layer 71*a*, an insulation layer 71*b*, and a second conductive layer 71*c*. The first conductive layer 71*a* and the second conductive layer 71*c* can be disposed with the insulation layer 71*b* therebetween. The first connection portion 71 can include a first region 71-1 and a second region 71-2. In the first connection portion 71, the first region 71-1 can be a region which is provided between the second electrode layer 15 of the first vibration portion 10-1 and the first electrode layer 13 of the second vibration portion 10-2. In the first connection portion 71, the first region 71-1 can be a region which is disposed or interposed in the concave portion 21 of the intermediate member 20. Accordingly, the first region 71-1 can contact the second electrode layer 15 of the first vibration portion 10-1 and the first electrode layer 13 of the second vibration portion 10-2.

The first region 71-1 can include the first conductive layer 71*a*, the insulation layer 71*b*, and the second conductive layer 71*c*. The first conductive layer 71*a* and the second conductive layer 71*c* can be disposed with the insulation layer 71*b* therebetween. The first conductive layer 71*a* of the first region 71-1 can adjoin the first electrode layer 13 of the second vibration portion 10-2, and the second conductive layer 71*c* can adjoin the second electrode layer 15 of the first vibration portion 10-1. A first hole H1 can be provided in the first region 71-1 of the first connection portion 71. The first hole H1 can be formed to pass through the first conductive layer 71*a*, the insulation layer 71*b*, and the second conductive layer 71*c*. An adhesive 80 can be accommodated (or inserted or dotted) in the first hole H1 and can be electrically connected with the first region 71-1, the second electrode layer 15 of the first vibration portion 10-1, and the first electrode layer 13 of the second vibration portion 10-2.

Accordingly, the second electrode layer 15 of the first vibration portion 10-1 can be electrically connected with the first electrode layer 13 of the second vibration portion 10-2 by the first connection portion 71.

In an embodiment of the present disclosure, the first hole H1 can be provided and the adhesive 80 can be accommodated (or inserted or dotted) in the first hole H1, and thus, the first conductive layer 71*a* of the first connection portion 71 can be electrically connected with the second conductive layer 71*b* of the first connection portion 71, and the first connection portion 71 can be connected with the second electrode layer 15 of the first vibration portion 10-1 and the first electrode layer 13 of the second vibration portion 10-2. For example, the adhesive 80 can be a conductive adhesive. For example, the adhesive 80 can connect a sintered material of the first vibration portion 10-1 with a sintered material of the second vibration portion 10-2, in manufacturing the sintered material of the first vibration portion 10-1 and the sintered material of the second vibration portion 10-2. For example, the adhesive 80 can connect the first vibration portion 10-1 with the second vibration portion 10-2. In connecting the sintered material of the first vibration portion 10-1 with the sintered material of the second vibration portion 10-2 by the adhesive 80, an attachment area (or an adhesion area) of the adhesive 80 can be small, and thus, the first hole H1 can perform a fixing function or an electrical conduction function so that the adhesive 80 is not pushed from a lower portion of the first hole H1 to an upper portion of the first hole H1. For example, a size of the first hole H1 can be about 500 μm to about 1,000 μm, but embodiments of the present disclosure are not limited thereto. When a size of the first hole H1 is less than 500 μm, the adhesiveness of the adhesive 80 can decrease. For example, the first hole H1 can be a through hole, an electrical conduction hole, or a via hole, but embodiments of the present disclosure are not limited thereto.

The second region 71-2 of the first connection portion 71 can be bent toward the second cover member 50 from the first region 71-1 and can adjoin a second surface (or an upper surface) of the second electrode layer 15 of the second vibration portion 10-2. The second region 71-2 can include an insulation layer 71*b* and a second conductive layer 71*c*. For example, the second region 71-2 of the first connection portion 71 may not include the first conductive layer 71*a*. For example, the first conductive layer 71*a* and the second conductive layer 71*c* may not be electrically connected with each other in the second region 71-2 of the first connection portion 71, and thus, a hole may not be formed. Accordingly, in the second region 71-2 of the first connection portion 71, the insulation layer 71*b* can be connected with the second surface (or the upper surface) of the second electrode layer 15 of the second vibration portion 10-2. The insulation layer 71*b* of the second region 71-2 can be attached on the second surface (or the upper surface) of the second electrode layer 15 of the second vibration portion 10-2 by an adhesive layer. For example, the adhesive layer can be an insulation pad, a single-sided insulation tape, a double-sided insulation tape, a pad, an intermediate member, or an intermediate insulation pad, but embodiments of the present disclosure are not limited thereto.

Therefore, the first connection portion 71 can be connected with the second electrode layer 15 of the first vibration portion 10-1 and the first electrode layer 13 of the second vibration portion 10-2, and can be electrically connected with the first signal line 93 at the upper surface of the second electrode layer 15 of the second vibration portion 10-2. Therefore, the first connection portion 71 can be connected with the second electrode layer 15 of the first vibration portion 10-1 and the first electrode layer 13 of the second vibration portion 10-2, can be electrically insulated from the second electrode layer 15 of the second vibration portion 10-2, and can be electrically connected with the first signal line 93 provided between the second electrode layer 15 of the second vibration portion 10-2 and the second cover member 50. Accordingly, the first signal line 93 can be provided between the second electrode layer 15 of the second vibration portion 10-2 and the second cover member 50.

According to an embodiment of the present disclosure, the first vibration portion 10-1 can be connected or coupled to the second vibration portion 10-2 by the first connection portion 71 or the first region 71-1, and thus, a vibration apparatus having a bimorph shape can be easily manufactured.

Referring to FIGS. 7, 9, and 10, the second connection portion 73 can be spaced apart from the first connection portion 71 with the third connection portion 75 therebetween. The conductive layers 73*a* and 73*c* of the second connection portion 73 and the conductive layers 71*a* and 71*c* of the first connection portion 71 can be electrically insulated from one another with the third connection portion 75 therebetween.

The second connection portion 73 can include a third region 73-1 and a fourth region 73-2. The third region 73-1 of the second connection portion 73 can be a region which adjoins the second electrode layer 15 of the second vibration portion 10-2. The third region 73-1 of the second connection portion 73 can include a first conductive layer 73*a*, an insulation layer 73*b*, and a second conductive layer 73*c*. The first conductive layer 73*a* and the second conductive layer 73*c* can be provided with the insulation layer 73*b* therebetween. The first conductive layer 73*a* of the third region 73-1 can adjoin an upper surface of the second electrode layer 15 of the second vibration portion 10-2. The second conductive layer 73*c* of the third region 73-1 can adjoin the second signal line 95. A second hole H2 can be formed in the third region 73-1 of the second connection portion 73. The second hole H2 can be formed to pass through the first conductive layer 73*a*, the insulation layer 73*b*, and the second conductive layer 73*c*. The adhesive 80 can be accommodated (or inserted or dotted) in the second hole H2 and can be electrically connected the third region 73-1, the second electrode layer 15 of the second vibration portion 10-2, and the first electrode layer 13 of the first vibration portion 10-1 with one another.

The fourth region 73-2 of the second connection portion 73 can extend from the third region 73-1 and can be bent toward the first surface (or the lower surface) of the first electrode layer 13 of the first vibration portion 10-1. The fourth region 73-2 of the second connection portion 73 can be a region which adjoins the first surface (or the lower surface) of the first vibration portion 10-1. The fourth region 73-2 of the second connection portion 73 can be a region which adjoins the first electrode layer 13 of the first vibration portion 10-1. The fourth region 73-2 of the second connection portion 73 can include a first conductive layer 73*a*, an insulation layer 73*b*, and a second conductive layer 73*c*. In the fourth region 73-2 of the second connection portion 73, the first conductive layer 73*a* and the second conductive layer 73*c* can be provided with the insulation layer 73*b* therebetween. The first conductive layer 73*a* of the fourth region 73-2 can adjoin a lower surface of the first electrode layer 13 of the first vibration portion 10-1. A third hole H3 can be formed in the fourth region 73-2 of the second connection portion 73. The third hole H3 can be formed to pass through the first conductive layer 73*a*, the insulation layer 73*b*, and the second conductive layer 73*c*. The adhesive 80 can be accommodated (or inserted or dotted) in the third hole H3 and can be electrically connected the fourth region 73-2 of the second connection portion 73, the first electrode layer 13 of the first vibration portion 10-1, and the second electrode layer 15 of the second vibration portion 10-2 with one another. Accordingly, the second electrode layer 15 of the second vibration portion 10-2 can be electrically connected with the first electrode layer 13 of the first vibration portion 10-1 by the second connection portion 73. The second signal line 95 can be connected with an upper surface (or a second surface) of the third region 73-1 of the second connection portion 73. For example, the third hole H3 can be a through hole, an electrical conduction hole, or a via hole, but embodiments of the present disclosure are not limited thereto.

The third connection portion 75 can be connected or disposed between the first connection portion 71 and the second connection portion 73. The third connection portion 75 can be provided on or at an upper surface of the second electrode layer 15 of the second vibration portion 10-2. The signal cable 90 can be electrically connected with the vibration generating portion 10, between the second surface 10*b* of the vibration generating portion 10 and the second cover member 50. For example, the signal cable 90 can be electrically connected with the connection member 70 on the second surface (or the upper surface) of the second vibration portion 10-2. For example, the signal cable 90 can be disposed between the second surface (or the upper surface) of the second vibration portion 10-2 and the second cover member 50, and can be connected with the vibration generating portion 10 by the connection member 70.

The signal cable 90 can include a first signal line 93 and a second signal line 95. The first signal line 93 can be electrically connected with the first connection portion 71 electrically connected with the second electrode layer 15 of the first vibration portion 10-1 and the first electrode layer 13 of the second vibration portion 10-2, at the second surface (or the upper surface) of the second vibration portion 10-2. The second signal line 95 can be electrically connected with the second connection portion 73 electrically connected with the first electrode layer 13 of the first vibration portion 10-1 and the second electrode layer 15 of the second vibration portion 10-2. For example, the signal cable 90 can be configured to respectively supply different driving signals to the first connection portion 71 and the second connection portion 73 connected with the vibration generating portion 10. For example, the signal cable 90 can be configured to respectively supply different driving signals to the second electrode layer 15 of the first vibration portion 10-1, the first electrode layer 13 of the second vibration portion 10-2, the first electrode layer 13 of the first vibration portion 10-1, and the second electrode layer 15 of the second vibration portion 10-2.

Referring to FIGS. 7, 10, and 11, according to an embodiment of the present disclosure, end portions 93*a* and 95*a* of each of the first signal line 93 and the second signal line 95 of the signal cable 90 can be electrically connected with the first connection portion 71 and the second connection portion 73 provided in the second electrode layer 15 of the second vibration portion 10-2, respectively.

The end portion 93*a* of the first signal line 93 can be electrically connected with the first connection portion 71, between the second surface 10*b* of the second vibration portion 10-2 and the second cover member 50. The end portion 93*a* of the first signal line 93 can be electrically connected with the second electrode layer 15 of the first vibration portion 10-1 and the first electrode layer 13 of the second vibration portion 10-2 connected with the first connection portion 71. Accordingly, the driving signal (or the first driving signal) supplied from the vibration driving circuit can be supplied to the second electrode layer 15 of the first vibration portion 10-1 and the first electrode layer 13 of the second vibration portion 10-2 through the first signal line 93.

The end portion 95*a* of the second signal line 95 can be electrically connected with the second connection portion 73, between the second surface 10*b* of the second vibration portion 10-2 and the second cover member 50. The end portion 95*a* of the second signal line 95 can be electrically connected with the first electrode layer 13 of the first vibration portion 10-1 and the second electrode layer 15 of the second vibration portion 10-2 that are connected with the second connection portion 73. Accordingly, the driving signal (or the second driving signal) supplied from the vibration driving circuit can be supplied to the first electrode layer 13 of the first vibration portion 10-1 and the second electrode layer 15 of the second vibration portion 10-2 through the second signal line 95.

According to an embodiment of the present disclosure, a portion of the signal cable 90 can be disposed or inserted (or accommodated) between the second surface 10*b* of the vibration generating portion 10 and the second cover member 50, and thus, the signal cable 90 can be provided as one body with the vibration generating portion 10, whereby the signal cable 90 and the vibration generating portion 10 can be configured as one part or one component.

The vibration apparatus according to another embodiment of the present disclosure can have substantially the same effect as that of the vibration apparatus according to an embodiment or the embodiment of FIGS. 1-6 of the present disclosure. Further, the vibration apparatus according to another embodiment of the present disclosure can include the plurality of vibration portions 10-1 and 10-2 which overlap or overlay each other to vibrate (or displace or drive) in the same direction, and thus, vibration efficiency or vibration characteristic can be enhanced and a vibration width (or a displacement width or a driving width) can be maximized, whereby a sound characteristic and/or a sound pressure level characteristic of a pitched sound band including a low-pitched sound band can be enhanced.

Figure 13:
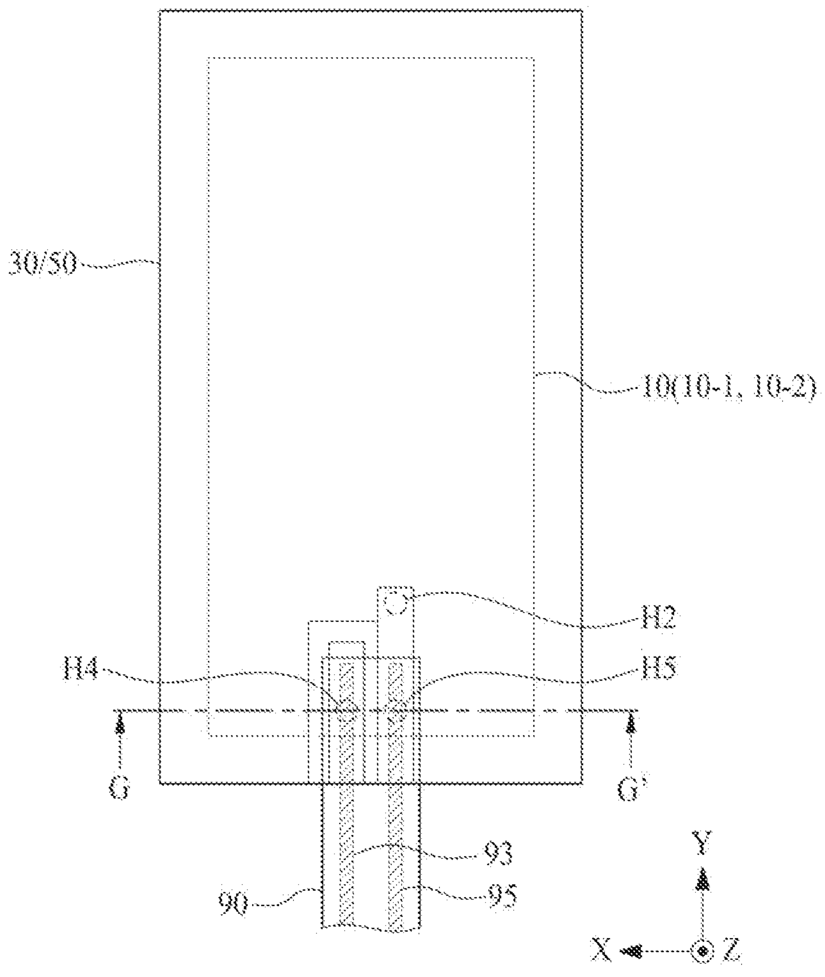
FIG. 13 illustrates a vibration apparatus according to another embodiment of the present disclosure.
Figure 14:
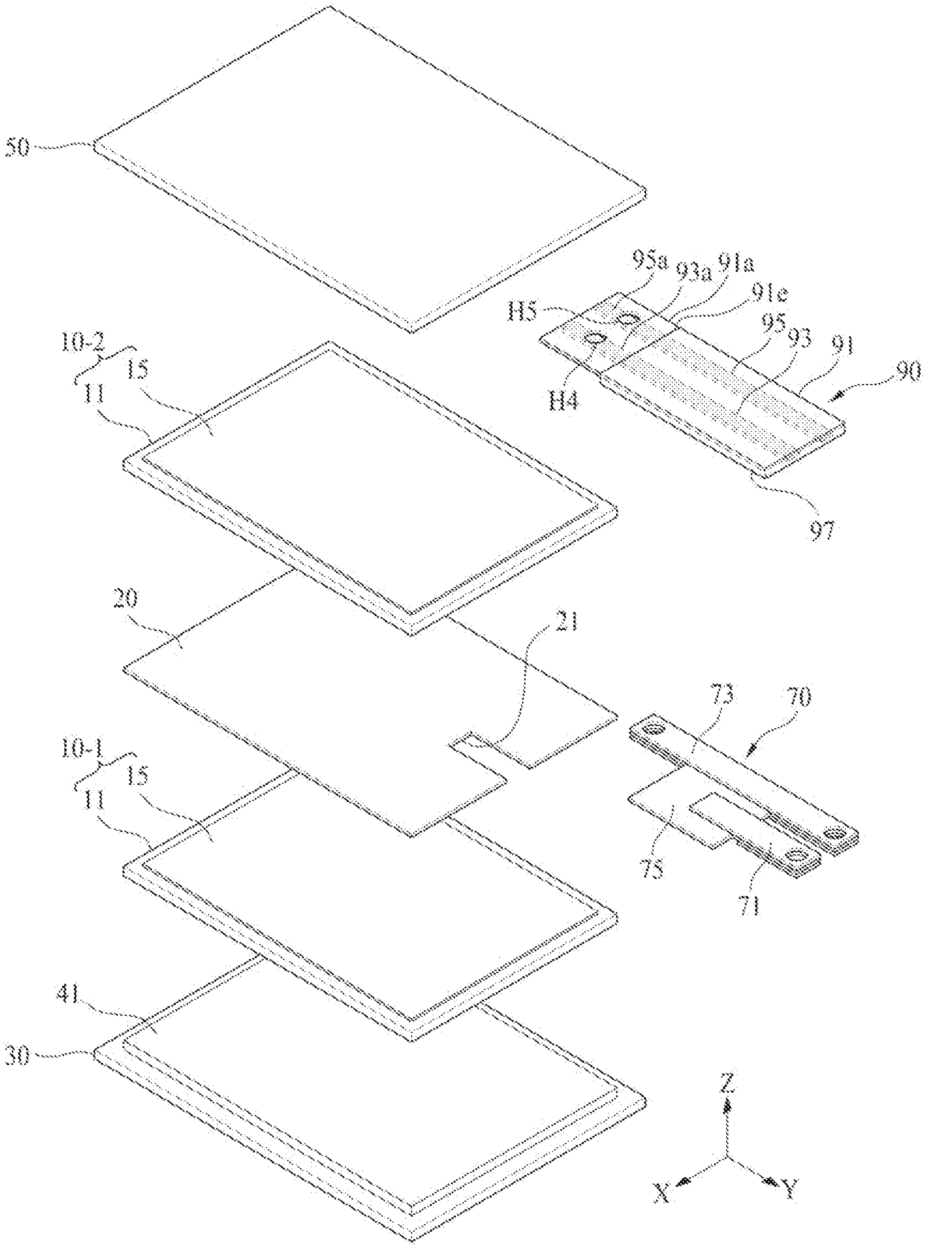
FIG. 14 is an exploded perspective view of the vibration apparatus illustrated in FIG. 13 according to another embodiment of the present disclosure.
Figure 15:
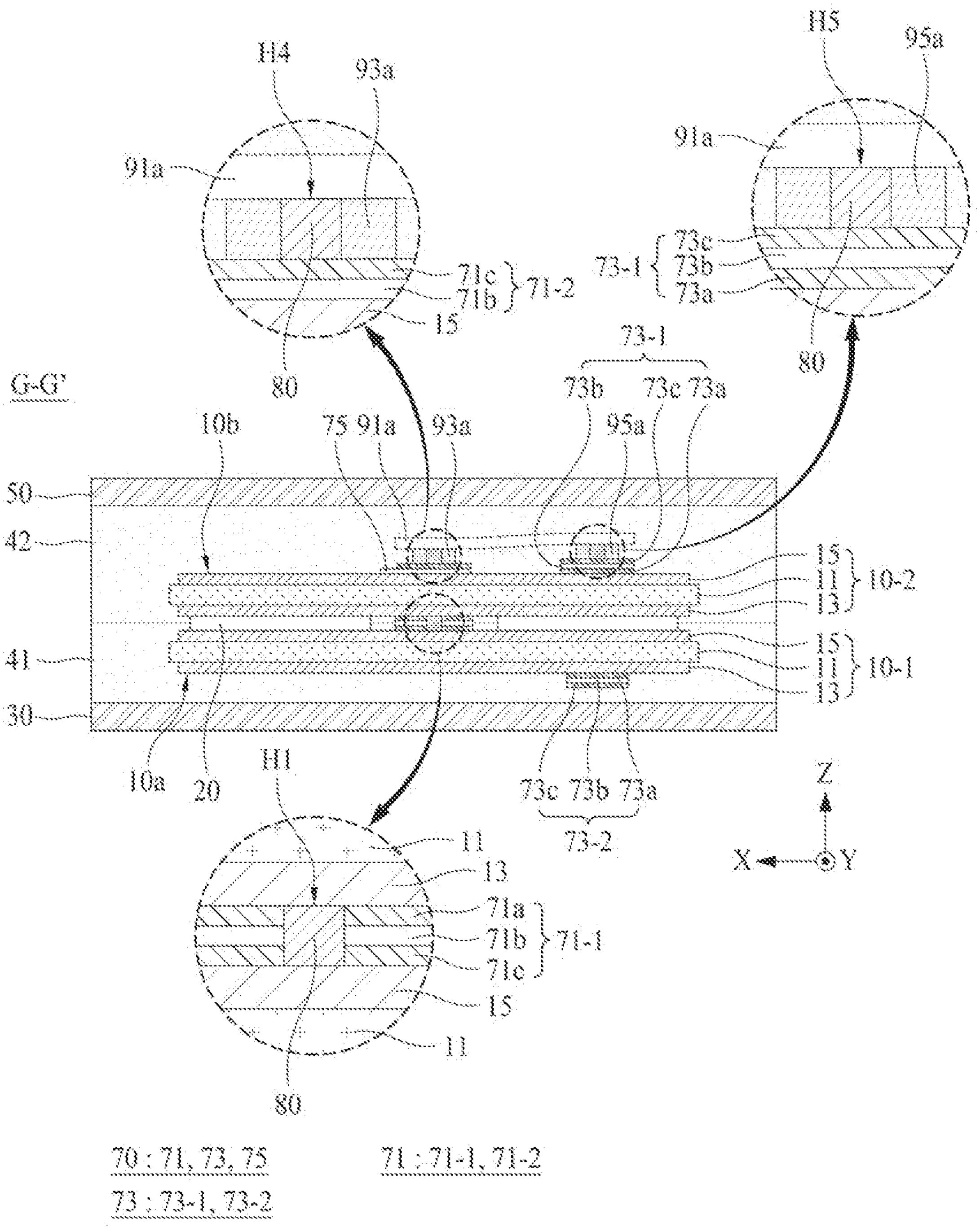
FIG. 15 is a cross-sectional view taken along line G-G' illustrated in FIG. 13 according to another embodiment of the present disclosure.

FIG. 13 illustrates a vibration apparatus according to another embodiment of the present disclosure. FIG. 14 is an exploded perspective view of the vibration apparatus illustrated in FIG. 13 according to another embodiment of the present disclosure. FIG. 15 is a cross-sectional view taken along line G-G' illustrated in FIG. 13 according to another embodiment of the present disclosure. Except for that a signal cable includes a hole, a vibration apparatus according to another embodiment of the present disclosure can be the same or substantially the same as the vibration apparatus according to another embodiment of the present disclosure described above with reference to FIGS. 7 to 12. Hereinafter, therefore, different elements will be described.

Referring to FIGS. 13 to 15, a signal cable 90 according to another embodiment of the present disclosure can include a first signal line 93 and a second signal line 95.

A fourth hole H4 can be formed at an end portion 93*a* of the first signal line 93. The fourth hole H4 can be formed to pass through the end portion 93*a* of the first signal line 93 and a first base member 91. An adhesive 80 can be accommodated (or inserted or dotted) in the fourth hole H4. For example, the end portion 93*a* of the first signal line 93 can be disposed at the first connection portion 71, and the adhesive 80 can be accommodated (or inserted or dotted) in the fourth hole H4. Subsequently, the fourth hole H4 and the adhesive 80 can be pressed by a plate which is not attached on the adhesive 80, and then, the adhesive 80 can be coagulated. For example, the adhesive 80 can be compressed by heating performed for about 60 minutes at a temperature of about 150° C., but embodiments of the present disclosure are not limited thereto. The plate can be fixed so that the adhesive 80 does not flow out to the outside of the fourth hole H4, and the adhesive 80 can be coagulated and then can be removed. Accordingly, the end portion 93*a* of the first signal line 93 can be easily fixed to the first connection portion 71. For example, the fourth hole H4 can be a through hole, an electrical conduction hole, or a via hole, but embodiments of the present disclosure are not limited thereto.

A fifth hole H5 can be formed at an end portion 95*a* of the second signal line 95. The fifth hole H5 can be formed to pass through the end portion 95*a* of the second signal line 95 and the first base member 91. The adhesive 80 can be accommodated (or inserted or dotted) in the fifth hole H5. For example, the end portion 95*a* of the second signal line 95 can be disposed at the second connection portion 73, and the adhesive 80 can be accommodated (or inserted or dotted) in the fifth hole H5. Subsequently, the fifth hole H5 and the adhesive 80 can be pressed by a plate which is not attached on the adhesive 80, and then, the adhesive 80 can be coagulated. For example, the adhesive 80 can be compressed through heating performed for about 60 minutes at a temperature of about 150° C., but embodiments of the present disclosure are not limited thereto. The plate can be fixed so that the adhesive 80 does not flow out to the outside of the fifth hole H5, and the adhesive 80 can be coagulated and then can be removed. Accordingly, the end portion 93*a* of the first signal line 93 can be easily fixed to the second connection portion 73. For example, the fifth hole H5 can be a through hole, an electrical conduction hole, or a via hole, but embodiments of the present disclosure are not limited thereto.

Figure 16:
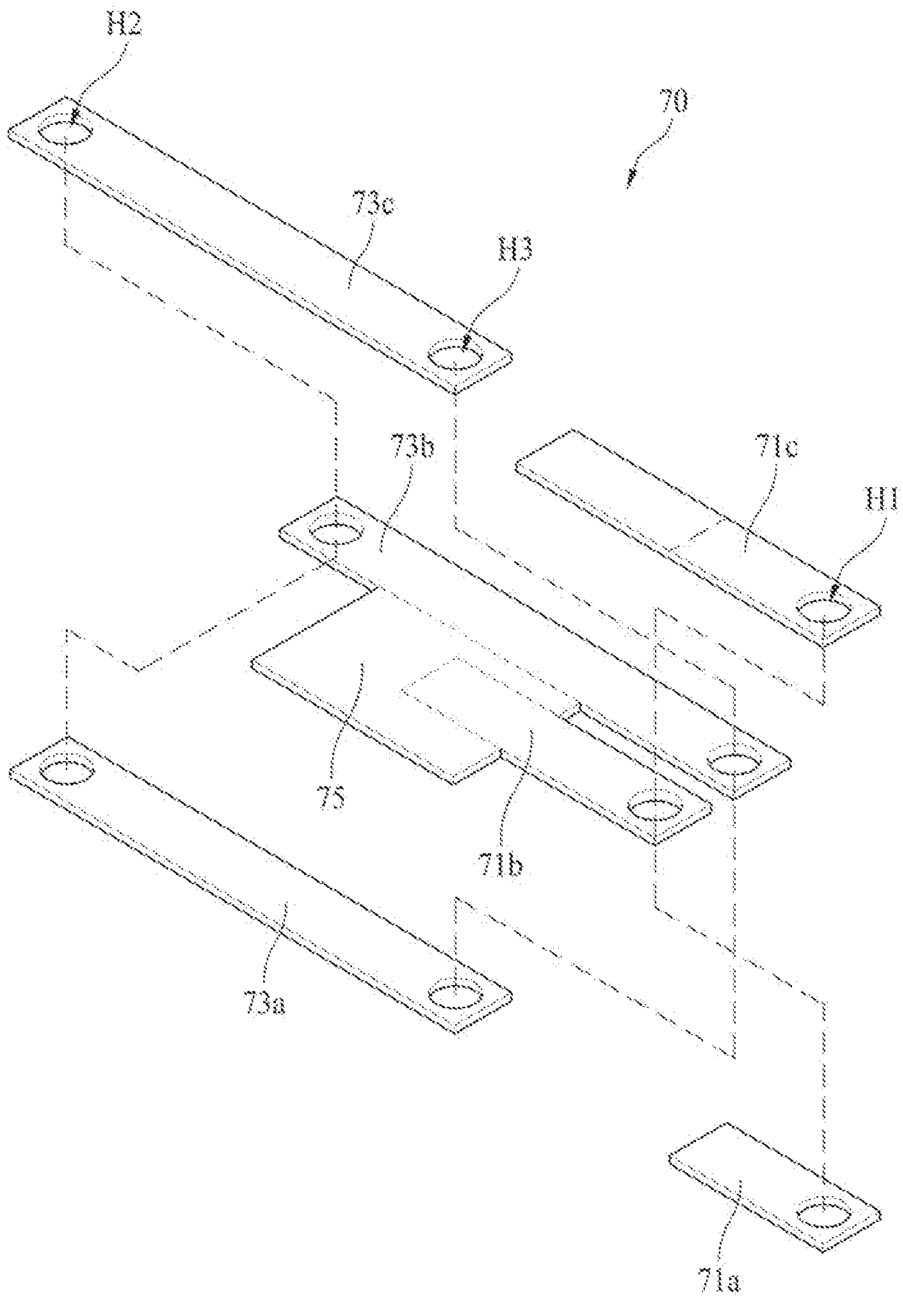
FIG. 16 is a perspective view illustrating a connection member according to an embodiment of the present disclosure.
Figure 17:
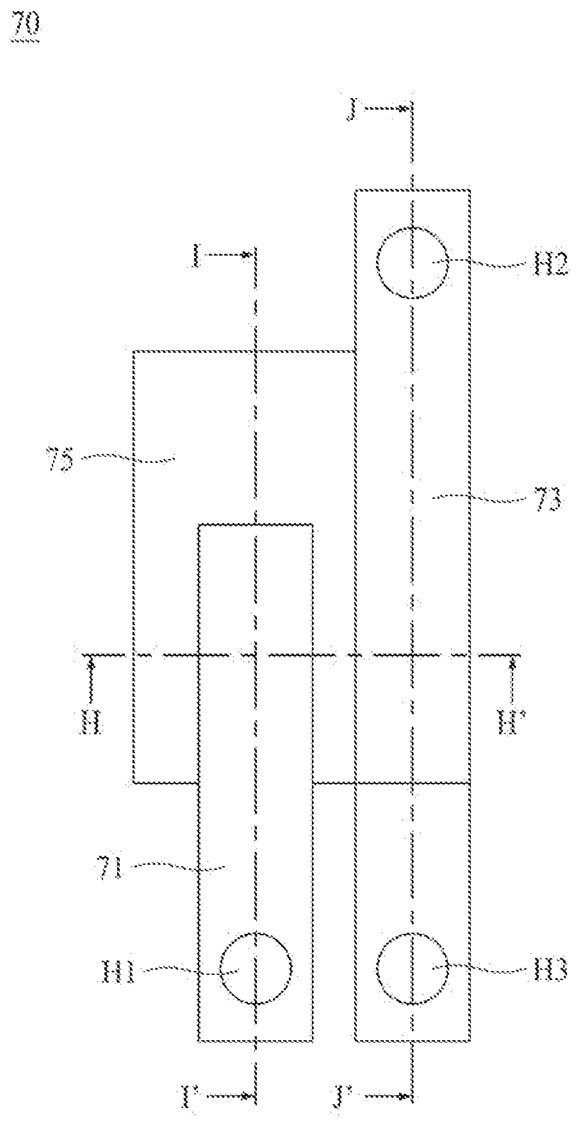
FIG. 17 is a plan view illustrating a connection member illustrated in FIG. 16 according to an embodiment of the present disclosure.
Figure 18:
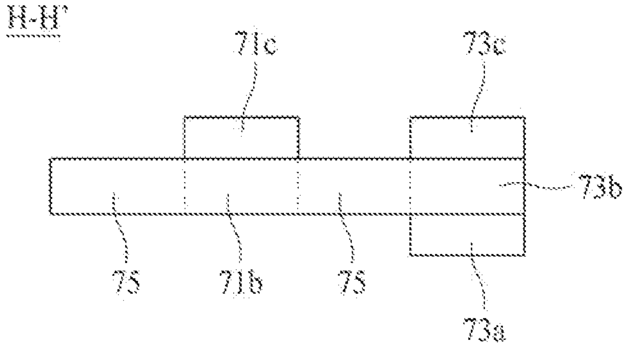
FIG. 18 is a cross-sectional view taken along line H-H' illustrated in FIG. 17 according to an embodiment of the present disclosure.
Figure 19:
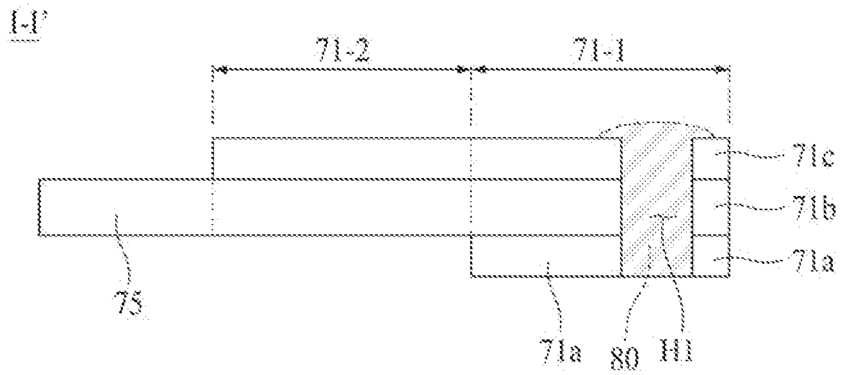
FIG. 19 is a cross-sectional view taken along line I-I' illustrated in FIG. 17 according to an embodiment of the present disclosure.
Figure 20:
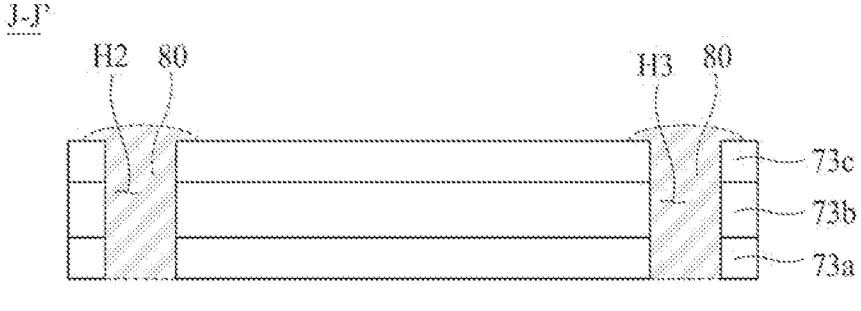
FIG. 20 is a cross-sectional view taken along line J-J' illustrated in FIG. 17 according to an embodiment of the present disclosure.

FIG. 16 is a perspective view illustrating a connection member according to an embodiment of the present disclosure. FIG. 17 is a plan view illustrating the connection member illustrated in FIG. 16 according to an embodiment of the present disclosure. FIG. 18 is a cross-sectional view taken along line H-H' illustrated in FIG. 17 according to an embodiment of the present disclosure. FIG. 19 is a cross-sectional view taken along line I-I' illustrated in FIG. 17 according to an embodiment of the present disclosure. FIG. 20 is a cross-sectional view taken along line J-J' illustrated in FIG. 17 according to an embodiment of the present disclosure.

Referring to FIGS. 16 to 20, a connection member 70 according to an embodiment of the present disclosure can have a structure where conductive layers are respectively stacked on a first surface and a second surface of an insulation layer with the insulation layer therebetween. For example, the conductive layer can be a copper (Cu) thin film, but embodiments of the present disclosure are not limited thereto. For example, a connection member 70 can be obtained by patterning a double-sided copper film (or a double-sided copper clade laminate film) disposed on each of the first surface and the second surface and cutting the insulation layer. For example, the connection member 70 can be obtained by cutting the insulation layer between the copper layers after patterning each of the copper layers stacked on both surfaces with the insulation layer therebetween. For example, a thickness of the connection member 70 can be about 25 μm to about 50 μm. For example, a thickness of each of the conductive layers can be about 3 μm or less. For example, when a thickness of the connection member 70 is greater than about 50 μm or a thickness of each conductive layer is greater than about 3 μm, a crack can occur in a vibration generating portion 10 and the connection member 70 in accommodating (or inserting) the vibration generating portion 10, and due to this, poling of an electrode layer may not be performed in a high voltage. For example, in another embodiment of the present disclosure described above with reference to FIGS. 7 to 12, a thickness of an intermediate member (or a thermo-curable insulation film) provided between a plurality of vibration portions can be about 50 μm. Therefore, when a thickness of the connection member 70 is greater than about 50 μm, a thickness of a first region 71-1 of a first connection portion 71 inserted in a concave portion of an intermediate member 20 can be greater than about 50 μm. Accordingly, a step height may occur between a plurality of vibration generating portions and the connection member 70, a crack issue may occur in the connection member 70 due to the step height, and poling of the electrode layer may not be performed well in the high voltage.

Moreover, when a thickness of the connection member 70 is greater than about 50 μm and the connection member 70 is accommodated (or inserted) between the plurality of vibration portions as in another embodiment of the present disclosure described above with reference to FIGS. 7 to 12, a step height which may be caused by the electrode layer may occur between the plurality of vibration portions. Accordingly, a thickness of the connection member 70 can be adjusted to about 25 μm to about 50 μm, and a thickness of each conductive layer can be adjusted to about 3 μm or less.

The connection member 70 according to an embodiment of the present disclosure can include a first connection portion 71, a second connection portion 73, and a third connection portion 75.

The first connection portion 71 can include a first conductive layer 71*a*, an insulation layer 71*b*, and a second conductive layer 71*c*. The first conductive layer 71*a* and the second conductive layer 71*c* according to an embodiment of the present disclosure can be disposed with the insulation layer 71*b* therebetween.

Referring to FIG. 19, the first connection portion 71 can include a first region 71-1 and a second region 71-2. The first region 71-1 can be a region which adjoins a first surface (or a lower surface) of a first electrode layer, of the first connection portion 71. Therefore, the first region 71-1 can include a first conductive layer 71*a*, an insulation layer 71*b*, and a second conductive layer 71*c*. The second region 71-2 can be a region which adjoins a second surface (or an upper surface) of a second electrode layer and can include an insulation layer 71*b* and a second conductive layer 71*c*. The first conductive layer 71*a* may not be provided in the second region 71-2 and the insulation layer 71*b* can contact the second electrode layer, and thus, the first conductive layer 71*a* and the second conductive layer 71*c* connected with the first electrode layer can be insulated from the second electrode layer. For example, the insulation layer 71*b* provided in the second region 71-2 can insulate the first conductive layer 71*a* and the second conductive layer 71*c* from the second electrode layer.

The first connection portion 71 can include a first hole H1. The first hole H1 can pass through the first conductive layer 71*a*, the insulation layer 71*b*, and the second conductive layer 71*c*, in the first region 71-1. The adhesive 80 can be accommodated (or inserted or dotted) in the first hole H1. The adhesive 80 can be dotted and filled in the first hole H1. For example, the adhesive 80 can be dotted in the first hole H1, and then, can be compressed through heating performed for about 60 minutes at a temperature of about 150° C., but embodiments of the present disclosure are not limited thereto. A portion of the adhesive 80 can be provided near the first hole H1, but embodiments of the present disclosure are not limited thereto.

Referring to FIGS. 18 and 20, the second connection portion 73 can include a first conductive layer 73*a*, an insulation layer 73*b*, and a second conductive layer 73*c*. The first conductive layer 71*a* and the second conductive layer 71*c* of the first connection portion 71 and the first conductive layer 73*a* and the second conductive layer 73*c* of the second connection portion 73 can be spaced apart from one another with the third connection portion 75 therebetween.

The second connection portion 73 can include a second hole H2 and a third hole H3. The second hole H2 and the third hole H3 can pass through the first conductive layer 73*a*, the insulation layer 73*b*, and the second conductive layer 73*c*. The adhesive 80 can be accommodated (or inserted or dotted) in each of the second hole H2 and the third hole H3. The adhesive 80 can be dotted and filled in each of the second hole H2 and the third hole H3. For example, the adhesive 80 can be dotted in the second hole H2 and the third hole H3, and then, can be compressed through heating performed for about 60 minutes at a temperature of about 150° C., but embodiments of the present disclosure are not limited thereto. A portion of the adhesive 80 can be provided near the second hole H2 and the third hole H3, based on thermal compression (or heat-pressed), but embodiments of the present disclosure are not limited thereto.

For example, the adhesive 80 can be compressed through heating performed for about 60 minutes at a temperature of about 150° C. and a portion of the adhesive 80 can be provided near the second hole H2, based on thermal compression (or heat-pressed), but embodiments of the present disclosure are not limited thereto.

The first hole H1 can connect the first conductive layer 71*a* and the second conductive layer 71*c* of the first connection portion 71 with each other, and simultaneously, can attach the first connection portion 71 on the first electrode layer. The second hole H2 can connect the first conductive layer 73*a* and the second conductive layer 73*c* of the second connection portion 73 with each other, and simultaneously, can attach the second connection portion 73 on the second electrode layer 15.

The third connection portion 75 can be connected or disposed between the first connection portion 71 and the second connection portion 73. The third connection portion 75 can be provided on an upper surface of the second electrode layer 15. For example, the third connection portion 75 can be an insulation film. The third connection portion 75 can be attached on the upper surface of the second electrode layer 15 by a single-sided insulation tape or a double-sided insulation tape. For example, a material of the third connection portion 75 is not limited to embodiments of the present disclosure.

Figure 21:
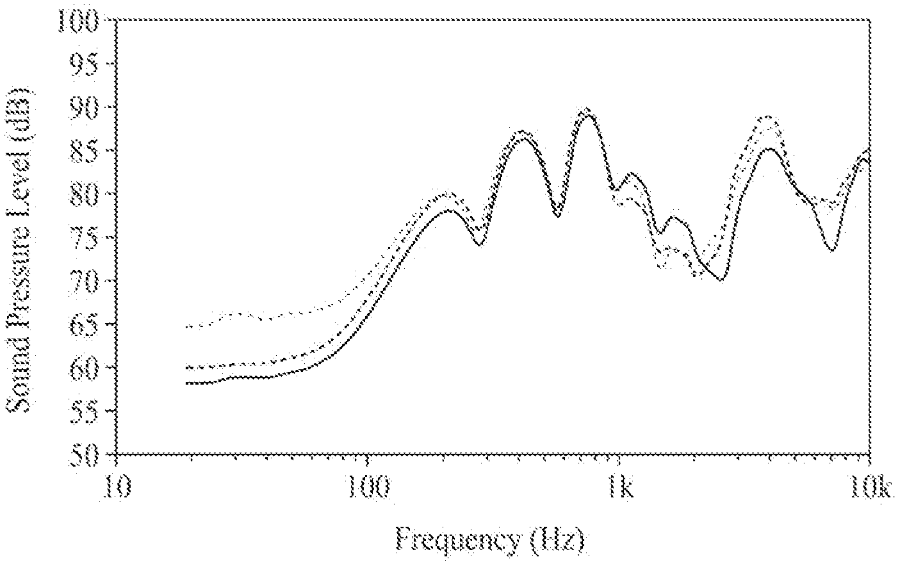
FIG. 21 illustrates an example of a sound output characteristic of a vibration apparatus according to one or more embodiments of the present disclosure.

FIG. 21 illustrates an example of a sound output characteristic of a vibration apparatus according to one or more embodiments of the present disclosure. In FIG. 21, the abscissa axis represents a frequency (Hz (hertz)), and the ordinate axis represents a sound pressure level (SPL) (dB (decibel)).

According to one or more embodiments of the present disclosure, a sound output characteristic can be measured by a sound analysis apparatus. The sound analysis apparatus can include a sound card which transmits or receives a sound to or from a control personal computer (PC), an amplifier which amplifies a signal generated from the sound card and transfers the amplified signal to an apparatus, and a microphone which collects a sound generated from a vibration of the apparatus in a display panel. The sound collected by the microphone can be input to the control PC through the sound card, and the sound of the vibration apparatus can be analyzed through checking in a control program.

A sound output characteristic has been measured in an anechoic chamber which is closed in all directions. In measurement, an applied frequency signal is applied as a sine sweep within a range of 150 Hz to 20 kHz, and ⅓ octave smoothing has been performed on a measurement result. A separation distance between the apparatus and the microphone has been set to about 30 cm. However, a measurement method of a sound output characteristic is not limited thereto.

In FIG. 21, a dotted line represents a sound output characteristic of a vibration generating portion in a vibration apparatus when 500 hours elapse after the vibration generating portion is connected with a signal cable by using copper (Cu) which is a double-sided conductive film. Hereinafter, a dotted line can be referred to as an experiment example 1. A thick solid line represents a sound output characteristic of a vibration generating portion in the vibration apparatus according to one or more embodiments of the present disclosure described above with reference to FIGS. 7 to 12. The thick solid line represents a sound output characteristic of when 500 hours elapse after attachment is performed by using nickel (Ni) as an adhesive member accommodated (or inserted or dotted) in a through portion and can be referred to as an embodiment 1. A thick dotted line is manufactured identical to the embodiment 1 and represents a sound output characteristic of when 500 hours elapse after attachment is performed by using silver (Ag) as an adhesive member dotted (or inserted) in a through portion. Hereinafter, the thick dotted line can be referred to as an embodiment 2. The embodiment 2 can differ from the embodiment 1 in only material of the adhesive member, and the other elements can be the same. The embodiment 2 is also a part of the embodiments of the present disclosure. FIG. 21 shows a sound output characteristic of a vibration apparatus after 500 hours elapse under a condition of high temperature and high humidity (85° C. and 85%).

As seen in FIG. 21, a vibration apparatus according to an experiment example 1 has an average sound pressure level of about 81.26 dB in a frequency of about 150 Hz to about 8 kHz and has an average sound pressure level of about 82.51 dB in a frequency of about 150 Hz to about 20 kHz. Accordingly, the vibration apparatus according to the experiment example 1 can have a sound pressure level characteristic of about 81.89 dB or more in a frequency of about 150 Hz to about 20 kHz.

A vibration apparatus according to an embodiment 1 of the present disclosure has an average sound pressure level of about 80.45 dB in a frequency of about 150 Hz to about 8 kHz and has an average sound pressure level of about 81.70 dB in a frequency of about 150 Hz to about 20 kHz. Accordingly, the vibration apparatus according to the embodiment 1 of the present disclosure can have a sound pressure level characteristic of about 81.08 dB or more in a frequency of about 150 Hz to about 20 kHz.

A vibration apparatus according to an embodiment 2 of the present disclosure has an average sound pressure level of about 80.56 dB in a frequency of about 150 Hz to about 8 kHz and has an average sound pressure level of about 81.93 dB in a frequency of about 150 Hz to about 20 kHz. Accordingly, the vibration apparatus according to the embodiment 2 of the present disclosure can have a sound pressure level characteristic of about 81.25 dB or more in a frequency of about 150 Hz to about 20 kHz.

The following Table 1 shows a result obtained by comparing sound pressure level characteristics of the experiment example 1, the embodiment 1, and the embodiment 2 and shows a result obtained by comparing a sound pressure level characteristic, measured under high temperature and high humidity (85° C. and 85%) immediately (0 hours) after a connection member is connected with a signal cable, with a sound pressure level characteristic measured under high temperature and high humidity (85° C. and 85%) (500 hours) after the connection member is connected with the signal cable.

TABLE 1

| | | | Experiment Example 1 | Embodiment 1 | Embodiment 2 |
|---|---|---|---|---|---|
| Sound | 0 hr | 150 Hz~8 kHz | 79.47 | 78.20 | 77.68 |
| Pressure | | 150 Hz~20 kHz | 80.59 | 79.63 | 79.57 |
| Level | 500 hr | 150 Hz~8 kHz | 81.26 | 80.45 | 80.56 |
| (dB) | | 150 Hz~20 kHz | 82.51 | 81.70 | 81.93 |

Referring to Table 1, in a case where a sound pressure level characteristic is measured immediately after the vibration generating portion is connected with the signal cable by using copper (Cu) which is a double-sided conductive film, the vibration apparatus according to the experiment example 1 has an average sound pressure level of about 79.47 dB in a frequency of about 150 Hz to about 8 kHz and has an average sound pressure level of about 80.59 dB in a frequency of about 150 Hz to about 20 kHz. In a case where a sound pressure level characteristic is measured when 500 hours elapse after the vibration generating portion is connected with the signal cable by using copper (Cu) which is a double-sided conductive film, the vibration apparatus according to the experiment example 1 has an average sound pressure level of about 81.26 dB in a frequency of about 150 Hz to about 8 kHz and has an average sound pressure level of about 82.51 dB in a frequency of about 150 Hz to about 20 kHz. In the vibration apparatus according to the experiment example 1, as a time elapses, an average sound pressure level has increased by about 1.79 dB in a frequency of about 150 Hz to about 8 kHz and has increased by about 1.92 dB in a frequency of about 150 Hz to about 20 kHz.

In a case where a sound pressure level characteristic is measured immediately after the vibration generating portion is connected with the signal cable, the vibration apparatus according to the embodiment 1 has an average sound pressure level of about 78.20 dB in a frequency of about 150 Hz to about 8 kHz and has an average sound pressure level of about 79.63 dB in a frequency of about 150 Hz to about 20 kHz. In a case where a sound pressure level characteristic is measured when 500 hours elapse after the vibration generating portion is connected with the signal cable, the vibration apparatus according to the embodiment 1 has an average sound pressure level of about 80.45 dB in a frequency of about 150 Hz to about 8 kHz and has an average sound pressure level of about 81.70 dB in a frequency of about 150 Hz to about 20 kHz. In the vibration apparatus according to the embodiment 1, as a time elapses, an average sound pressure level has increased by about 2.25 dB in a frequency of about 150 Hz to about 8 kHz and has increased by about 2.07 dB in a frequency of about 150 Hz to about 20 kHz.

In a case where a sound pressure level characteristic is measured immediately after the vibration generating portion is connected with the signal cable, the vibration apparatus according to the embodiment 2 has an average sound pressure level of about 77.68 dB in a frequency of about 150 Hz to about 8 kHz and has an average sound pressure level of about 79.57 dB in a frequency of about 150 Hz to about 20 kHz. In a case where a sound pressure level characteristic is measured when 500 hours elapse after the vibration generating portion is connected with the signal cable, the vibration apparatus according to the embodiment 2 has an average sound pressure level of about 80.56 dB in a frequency of about 150 Hz to about 8 kHz and has an average sound pressure level of about 81.93 dB in a frequency of about 150 Hz to about 20 kHz. In the vibration apparatus according to the embodiment 2, as a time elapses, an average sound pressure level has increased by about 2.88 dB in a frequency of about 150 Hz to about 8 kHz and has increased by about 2.36 dB in a frequency of about 150 Hz to about 20 kHz.

According to an embodiment of the present disclosure, vibration efficiency or vibration characteristic can be enhanced and a vibration width (or a displacement width or a driving width) can be maximized, and thus, a sound characteristic and/or a sound pressure level characteristic of a pitched sound band including a low pitched sound band can be enhanced. Further, in the vibration apparatus according to an embodiment of the present disclosure, as a time elapses, an average sound pressure level can increase, and thus, a sound pressure level characteristic can be further enhanced. According to an embodiment of the present disclosure, a vibration apparatus can be provided where a sound pressure level characteristic is not lowered despite the elapse of a time under a condition of high temperature and high humidity, and thus, reliability can be enhanced.

Figure 22:
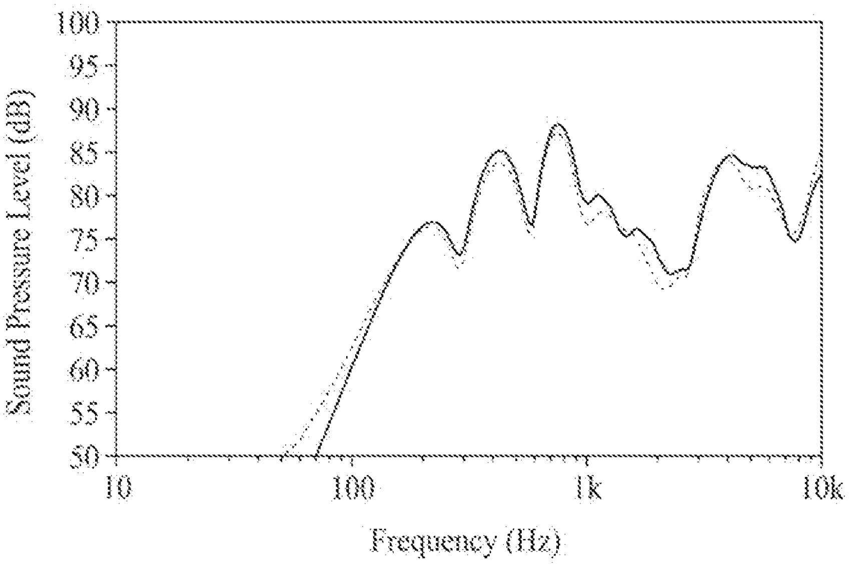
FIG. 22 illustrates an example of a sound output characteristic of a vibration apparatus according to one or more embodiments of the present disclosure.

FIG. 22 illustrates an example of a sound output characteristic of a vibration apparatus according to one or more embodiments of the present disclosure. In FIG. 22, the abscissa axis represents a frequency (Hz (hertz)), and the ordinate axis represents a sound pressure level (SPL) (dB (decibel)).

In FIG. 22, a dotted line represents a sound output characteristic of a vibration generating portion in a vibration apparatus when 168 hours elapse at a temperature of about 110° C. after the vibration generating portion is connected with a signal cable by using copper (Cu) which is a double-sided conductive film. Hereinafter, a dotted line can be referred to as an experiment example 2. A thick solid line represents a sound output characteristic of a vibration generating portion in the vibration apparatus according to an embodiment of the present disclosure described above with reference to FIGS. 7 to 12. The thick solid line represents a sound output characteristic of when 168 hours elapse after attachment is performed by using a conductive adhesive including silver (Ag) as an adhesive member accommodated (or inserted or dotted) in a through portion. Hereinafter, the thick solid line can be referred to as an embodiment 3. The embodiment 3 can differ from the embodiment 1 and the embodiment 2 in only material of the adhesive member, temperature, and time which has elapsed, and the other elements can be the same.

As seen in FIG. 22, a vibration apparatus according to an experiment example 2 has an average sound pressure level of about 77.97 dB in a frequency of about 150 Hz to about 8 kHz and has an average sound pressure level of about 78.51 dB in a frequency of about 150 Hz to about 20 kHz. Accordingly, the vibration apparatus according to the experiment example 2 can have a sound pressure level characteristic of about 78.24 dB or more in a frequency of about 150 Hz to about 20 kHz.

A vibration apparatus according to an embodiment 3 of the present disclosure has an average sound pressure level of about 78.92 dB in a frequency of about 150 Hz to about 8 kHz and has an average sound pressure level of about 80.09 dB in a frequency of about 150 Hz to about 20 kHz. Accordingly, the vibration apparatus according to the embodiment 3 of the present disclosure can have a sound pressure level characteristic of about 79.51 dB or more in a frequency of about 150 Hz to about 20 kHz.

The following Table 2 shows a result obtained by comparing sound pressure level characteristics of the experiment example 2 and the embodiment 3 and shows a result obtained by comparing a sound pressure level characteristic, measured immediately (0 hours) after a connection member is connected with a signal cable, with a sound pressure level characteristic measured when 168 hours elapse under a temperature of about 110° C. after the connection member is connected with the signal cable.

TABLE 2

| | | | Experiment Example 2 | Embodiment 3 |
|---|---|---|---|---|
| Sound | 0 hr | 150 Hz~8 kHz | 79.47 | 79.34 |
| Pressure | | 150 Hz~20 kHz | 80.59 | 80.23 |
| Level | 168 hr | 150 Hz~8 kHz | 77.98 | 78.92 |
| (dB) | | 150 Hz~20 kHz | 78.51 | 80.09 |

Referring to Table 2, in a case where a sound pressure level characteristic is measured immediately after the vibration generating portion is connected with the signal cable by using copper (Cu) which is a double-sided conductive film, the vibration apparatus according to the experiment example 2 has an average sound pressure level of about 79.47 dB in a frequency of about 150 Hz to about 8 kHz and has an average sound pressure level of about 80.59 dB in a frequency of about 150 Hz to about 20 kHz. In a case where a sound pressure level characteristic is measured when 168 hours elapse after the vibration generating portion is connected with the signal cable by using copper (Cu) which is a double-sided conductive film, the vibration apparatus according to the experiment example 2 has an average sound pressure level of about 77.98 dB in a frequency of about 150 Hz to about 8 kHz and has an average sound pressure level of about 80.59 dB in a frequency of about 150 Hz to about 20 kHz. In the vibration apparatus according to the experiment example 2, as a time elapses, an average sound pressure level has increased by about 1.50 dB in a frequency of about 150 Hz to about 8 kHz and has increased by about 2.08 dB in a frequency of about 150 Hz to about 20 kHz.

In a case where a sound pressure level characteristic is measured immediately after the vibration generating portion is connected with the signal cable by using a conductive adhesive including silver (Ag), the vibration apparatus according to the embodiment 3 has an average sound pressure level of about 79.34 dB in a frequency of about 150 Hz to about 8 kHz and has an average sound pressure level of about 80.23 dB in a frequency of about 150 Hz to about 20 kHz. In a case where a sound pressure level characteristic is measured when 168 hours elapse after the vibration generating portion is connected with the signal cable by using a conductive adhesive including silver (Ag), the vibration apparatus according to the embodiment 3 has an average sound pressure level of about 78.92 dB in a frequency of about 150 Hz to about 8 kHz and has an average sound pressure level of about 80.09 dB in a frequency of about 150 Hz to about 20 kHz. In the vibration apparatus according to the embodiment 3, as a time elapses, an average sound pressure level has increased by about 0.42 dB in a frequency of about 150 Hz to about 8 kHz and has increased by about 0.14 dB in a frequency of about 150 Hz to about 20 kHz.

According to an embodiment of the present disclosure, in a case where a sound pressure level characteristic is measured after 168 hours elapse at about 110° C., the experiment example 2 has decreased by about 2.08 dB in average sound pressure level, and the embodiment 3 has decreased by about 0.14 dB in average sound pressure level. Accordingly, in a case where a sound pressure level characteristic is measured after 168 hours elapse at about 110° C., it can be seen that the embodiment 3 of the present disclosure is reduced less in average sound pressure level than the experiment example 2.

According to an embodiment of the present disclosure, vibration efficiency or vibration characteristic can be enhanced and a vibration width (or a displacement width or a driving width) can be maximized, and thus, the amount of reduction in sound characteristic and/or sound pressure level characteristic is small despite a high temperature, whereby the reliability of a vibration apparatus can be enhanced. According to an embodiment of the present disclosure, a vibration apparatus can be provided where a decrease in sound characteristic and/or sound pressure level characteristic is small at a high temperature (for example, 110° C.), and thus, reliability is enhanced.

Figure 23:
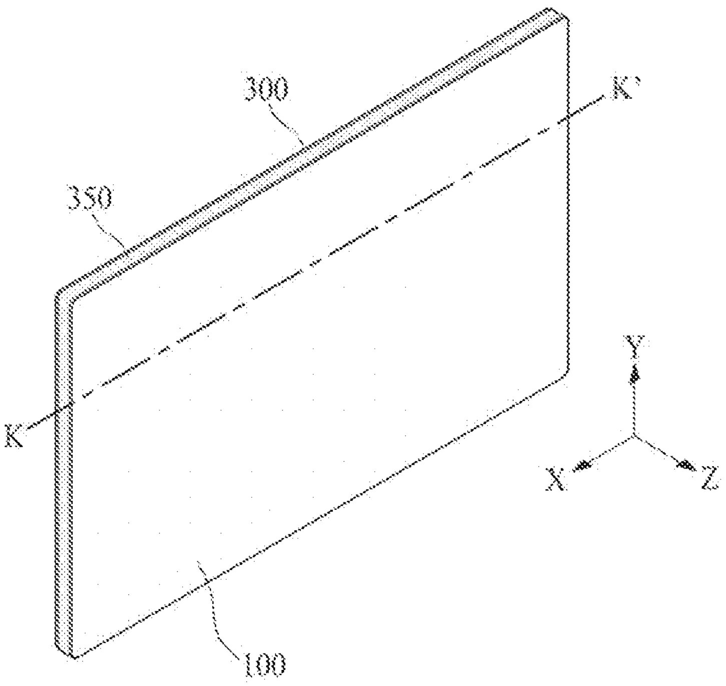
FIG. 23 illustrates an apparatus according to an embodiment of the present disclosure.
Figure 24:
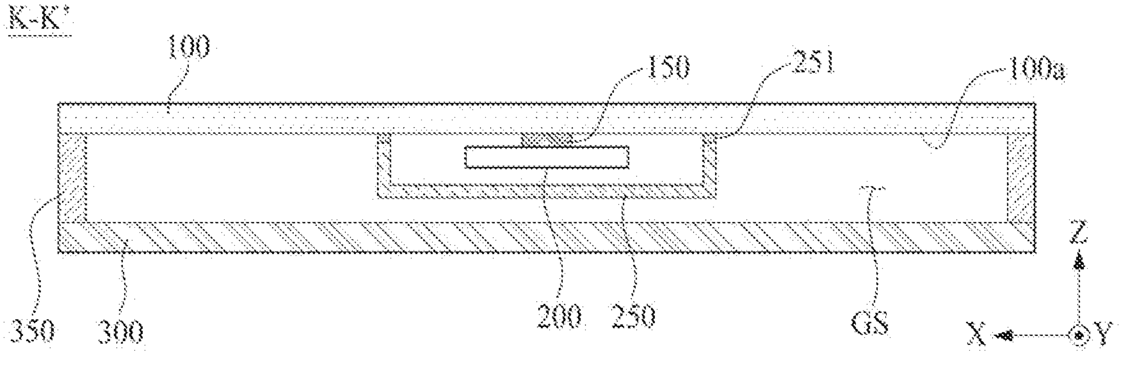
FIG. 24 is a cross-sectional view taken along line K-K' illustrated in FIG. 23 according to an embodiment of the present disclosure.

FIG. 23 illustrates an apparatus according to an embodiment of the present disclosure. FIG. 24 is a cross-sectional view taken along line K-K' illustrated in FIG. 23 according to an embodiment of the present disclosure.

Referring to FIGS. 23 and 24, an apparatus according to an embodiment of the present disclosure can include a passive vibration member 100 and one or more vibration generating apparatuses 200.

The apparatus according to an embodiment of the present disclosure can be a display apparatus, a sound apparatus, a sound generating apparatus, a sound bar, an analog signage, or a digital signage, or the like, or any apparatus that can utilize the vibrating apparatus (or part thereof) of the present disclosure, but embodiments of the present disclosure are not limited thereto.

The display apparatus can include a display panel including a plurality of pixels which implement a black/white or color image and a driver for driving the display panel. An image according to an embodiment of the present disclosure can include an electronic image, a digital image, a still image, or a video image, but embodiments of the present disclosure are not limited thereto. For example, the display panel can be an organic light emitting display panel, a light emitting diode display panel, an electrophoresis display panel, an electro-wetting display panel, a micro light emitting diode display panel, or a quantum dot light emitting display panel, or the like, but embodiments of the present disclosure are not limited thereto. For example, in the organic light emitting display panel, a pixel can include an organic light emitting device such as an organic light emitting layer or the like, and the pixel can be a subpixel which implements any one of a plurality of colors configuring a color image. Therefore, the apparatus according to an embodiment of the present disclosure can include a set device (or a set apparatus) or a set electronic device such as a notebook computer, a television (TV), a computer monitor, an equipment apparatus including an automotive apparatus or another type apparatus for vehicles, or a mobile electronic device such as a smartphone or a wearable device, or an electronic pad, or the like which is a complete product (or a final product) including a display panel such as an organic light emitting display panel, a liquid crystal display panel, or the like.

The analog signage can be an advertising signboard, a poster, a noticeboard, or the like. The analog signage can include content such as a sentence, a picture, and a sign, or the like. The content can be disposed at the passive vibration member 100 of the apparatus to be visible. For example, the content can be directly attached on the passive vibration member 100 and the content can be printed or the like on a medium such as paper, and the medium can be attached on the passive vibration member 100.

The passive vibration member 100 can vibrate based on driving (or vibration) of the one or more vibration generating apparatuses 200. For example, the passive vibration member 100 can generate one or more of a vibration and a sound based on driving of the one or more vibration generating apparatuses 200.

The passive vibration member 100 according to an embodiment of the present disclosure can be a display panel including a display area (or a screen) having a plurality of pixels which implement a black/white or color image. Thus, the passive vibration member 100 can generate one or more of a vibration and a sound based on driving of the one or more vibration generating apparatuses 200. For example, the passive vibration member 100 can vibrate based on a vibration of the vibration generating apparatus 200 while a display area is displaying an image, and thus, can generate or output a sound synchronized with the image displayed on the display area. For example, the passive vibration member 100 according to an embodiment of the present disclosure can be a vibration object, a display member, a display panel, a signage panel, a passive vibration plate, a front cover, a front member, a vibration panel, a sound panel, a passive vibration panel, a sound output plate, a sound vibration plate, or a video screen, but embodiments of the present disclosure are not limited thereto.

According to another embodiment of the present disclosure, the passive vibration member 100 can be a vibration plate including a metal material or a nonmetal material (or a complex nonmetal material), which has a material characteristic suitable for outputting a sound based on a vibration of each of the one or more vibration generating apparatuses 200. For example, the passive vibration member 100 can be a vibration plate including one or more materials of metal, plastic, paper, fiber, cloth, wood, leather, rubber, glass, carbon, and mirror. For example, the paper can be a cone paper for speakers. For example, the cone paper can be pulp or foam plastic, but embodiments of the present disclosure are not limited thereto.

The passive vibration member 100 according to another embodiment of the present disclosure can include a display panel including a pixel displaying an image, or can include a non-display panel. For example, the passive vibration member 100 can include one or more of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular exterior material, a vehicular glass window, a vehicular seat interior material, a ceiling material of a building, an interior material of a building, a glass window of a building, an interior material of an aircraft, a glass window of an aircraft, and mirror, but embodiments of the present disclosure are not limited thereto. For example, the non-display panel can be a light emitting diode lighting panel (or apparatus), an organic light emitting diode lighting panel (or apparatus), or an inorganic light emitting diode lighting panel (or apparatus), but embodiments of the present disclosure are not limited thereto.

The one or more vibration generating apparatuses 200 can be configured to vibrate the passive vibration member 100. The one or more vibration generating apparatuses 200 can be configured to be connected with a rear surface 100*a* of the passive vibration member 100 by a connection member 150. Accordingly, the one or more vibration generating apparatuses 200 can vibrate the passive vibration member 100, and thus, can generate or output one or more of a vibration and a sound, based on a vibration of the passive vibration member 100.

Each of the one or more vibration generating apparatuses 200 can include one or more of the vibration apparatuses (or part thereof) described above with reference to FIGS. 1 to 22. Accordingly, the descriptions of the vibration apparatuses illustrated in FIGS. 1 to 22 can be included in the descriptions of vibration apparatuses illustrated in FIGS. 23 and 24, and thus, like reference numerals refer to like elements and repetitive descriptions thereof are omitted.

The connection member 150 can be disposed between at least a portion of the vibration generating apparatus 200 and the passive vibration member 100. The connection member 150 can be connected between at least a portion of the vibration generating apparatus 200 and the passive vibration member 100. The connection member 150 according to an embodiment of the present disclosure can be connected between a center portion, except an edge portion (or a periphery portion), of the vibration generating apparatus 200 and the passive vibration member 100. For example, the connection member 150 can be connected between the center portion of the vibration generating apparatus 200 and the passive vibration member 100, based on a partial attachment scheme.

The center portion (or a middle portion) of the vibration generating apparatus 200 can be a center of a vibration, and thus, a vibration of the vibration generating apparatus 200 can be efficiently transferred to the passive vibration member 100 through the connection member 150. The edge portion of the vibration generating apparatus 200 can be in a state where the edge portion of the vibration generating apparatus 200 is raised from each of the connection member 150 and the passive vibration member 100 without being connected with the connection member 150 and/or the passive vibration member 100, and thus, when a flexural vibration (or a bending vibration) of the vibration generating apparatus 200 is performed, a vibration of the edge portion of the vibration generating apparatus 200 may not be reduced (prevented) by the connection member 150 and/or the passive vibration member 100, and thus, a vibration width (or a displacement width or a driving width) of the vibration generating apparatus 200 can increase. Accordingly, a vibration width (or a displacement width or a driving width) of the passive vibration member 100 based on a vibration of the vibration generating apparatus 200 can increase, and thus, a sound characteristic and a sound pressure level characteristic of a low-pitched sound band generated based on a vibration of the passive vibration member 100 can be enhanced.

According to another embodiment of the present disclosure, the connection member 150 can be connected with or attached on a whole front surface of each of the one or more vibration generating apparatuses 200 and the rear surface 100*a* of the passive vibration member 100, based on a front attachment scheme.

The connection member 150 according to an embodiment of the present disclosure can include a material including an adhesive layer which is good in adhesive force or attaching force with respect to each of the rear surface 100*a* of the passive vibration member 100 and each of the one or more vibration generating apparatuses 200. For example, the connection member 150 can include a foam pad, a double-sided tape, or an adhesive, but embodiments of the present disclosure are not limited thereto. For example, an adhesive layer of the connection member 150 can include epoxy, acryl, silicone, or urethane, but embodiments of the present disclosure are not limited thereto. For example, the adhesive layer of the connection member 150 can include an acrylic-based material, having a characteristic where an adhesive force is relatively good and hardness is high, compared to a urethane-based material. Accordingly, a vibration of the one or more vibration generating apparatuses 200 can be well transferred to the passive vibration member 100.

The apparatus according to an embodiment of the present disclosure can further include a supporting member 300 and a coupling member 350.

The supporting member 300 can be disposed at the rear surface 100*a* of the passive vibration member 100. The supporting member 300 can be disposed at the rear surface 100*a* of the passive vibration member 100 to cover the vibration generating apparatus 200. The supporting member 300 can be disposed at the rear surface 100*a* of the passive vibration member 100 to cover all of the rear surface 100*a* of the passive vibration member 100 and the vibration generating apparatus 200. For example, the supporting member 300 can have a size which is equal to that of the passive vibration member 100. For example, the supporting member 300 can cover the rear surface 100*a* of the passive vibration member 100 with the vibration generating apparatus 200 and a gap space GS therebetween. For example, the supporting member 300 can cover the whole rear surface 100*a* of the passive vibration member 100 with the vibration generating apparatus 200 and the gap space GS therebetween. The gap space GS can be provided by the coupling member 350 disposed between the passive vibration member 100 and the supporting member 300 facing each other. The gap space GS can be referred to as an air gap, an accommodating space, a vibration space, and a sound sounding box, but embodiments of the present disclosure are not limited thereto.

The supporting member can include one or more materials of a glass material, a metal material, and a plastic material. The supporting member 300 can have a stack structure where one or more materials of a glass material, a metal material, and a plastic material are stacked.

Each of the passive vibration member 100 and the supporting member 300 can have a square shape or a rectangular shape, but embodiments of the present disclosure are not limited thereto. For example, each of the passive vibration member 100 and the supporting member 300 can have a polygonal shape, a non-polygonal shape, a circular shape, or an oval shape. For example, in a case where the apparatus according to an embodiment of the present disclosure is applied to a sound apparatus or a sound bar, each of the passive vibration member 100 and the supporting member 300 can have a rectangular shape where a long-side length is twice or more longer than a short-side length, but embodiments of the present disclosure are not limited thereto.

The coupling member 350 can be configured to be connected between a rear edge portion (or a rear periphery portion) of the passive vibration member 100 and a front edge portion (or a front periphery portion) of the supporting member 300, and thus, the gap space GS can be provided between the passive vibration member 100 and the supporting member 300 facing each other.

The coupling member 350 according to an embodiment of the present disclosure can include an elastic material which has adhesive properties and is capable of compression and decompression. For example, the coupling member 350 can include an adhesive, a double-side tape, a single-sided tape, a double-side foam tape, a single-sided foam tape, a double-side foam pad, a single-side foam pad, a double-side adhesive foam pad, or a single-side adhesive foam pad, but embodiments of the present disclosure are not limited thereto. For example, the coupling member 350 can include an elastic pad such as a rubber pad or a silicone pad, which has adhesive properties and is capable of compression and decompression. For example, the coupling member 350 can include an elastomer.

As another example, the supporting member 300 can further include a sidewall portion which supports the rear edge portion (or the rear periphery portion) of the passive vibration member 100. The sidewall portion of the supporting member 300 can protrude or be bent toward the rear edge portion of the passive vibration member 100 from the front edge portion (or the front periphery portion) of the supporting member 300, and thus, the gap space GS can be provided between the passive vibration member 100 and the supporting member 300. In this case, the coupling member 350 can be configured to be connected between the sidewall portion of the supporting member 300 and the rear edge portion of the passive vibration member 100. Accordingly, the supporting member 300 can cover the one or more vibration generating apparatuses 200 and can support the rear surface 100*a* of the passive vibration member 100. For example, the supporting member 300 can cover the one or more vibration generating apparatuses 200 and can support the rear edge portion (or the rear periphery portion) of the passive vibration member 100.

As another example, the passive vibration member 100 can further include a sidewall portion which is connected with the front edge portion (or the front periphery portion) of the supporting member 300. The sidewall portion of the passive vibration member 100 can protrude or be bent toward the front edge portion of the supporting member 300 from the rear edge portion (or the rear periphery portion) of the passive vibration member 100, and thus, the gap space GS can be provided between the passive vibration member 100 and the supporting member 300. The passive vibration member 100 can increase in stiffness, based on the sidewall portion thereof. In this case, the coupling member 350 can be configured to be connected between the sidewall portion of the passive vibration member 100 and the rear edge portion (or the rear periphery portion) of the supporting member 300. Accordingly, the supporting member 300 can cover the one or more vibration generating apparatuses 200 and can support the rear surface 100*a* of the passive vibration member 100. For example, the supporting member 300 can cover the one or more vibration generating apparatuses 200 and can support the rear edge portion (or the rear periphery portion) of the passive vibration member 100.

The apparatus according to an embodiment of the present disclosure can further include one or more enclosures 250.

The enclosure 250 can be connected or coupled to the rear edge portion (or the rear periphery portion) of the passive vibration member 100 to individually cover the one or more vibration generating apparatuses 200. For example, the enclosure 250 can be connected or coupled to the rear surface 100*a* of the passive vibration member 100 by using a coupling member 251. The enclosure 250 can configure a sealing space, which covers or surrounds the one or more vibration generating apparatuses 200 in the rear surface 100*a* of the passive vibration member 100. For example, the enclosure 250 can be a sealing member, a sealing gap, a sealing box, or a sound box, but embodiments of the present disclosure are not limited thereto. The sealing space can be an air gap, a vibration space, a sound space, or a sounding box, but embodiments of the present disclosure are not limited thereto.

The enclosure 250 can include one or more materials of a metal material and a nonmetal material (or a complex nonmetal material). For example, the enclosure 250 can include one or more materials of metal, plastic, and wood, but embodiments of the present disclosure are not limited thereto.

The enclosure 250 according to an embodiment of the present disclosure can constantly maintain an impedance component based on air acting on the passive vibration member 100 when the passive vibration member 100 or the vibration generating apparatus 200 vibrates. For example, air around the passive vibration member 100 can resist to a vibration of the passive vibration member 100 and can act as an impedance component having a resistance and a reactance component, which vary based on a frequency. Accordingly, the enclosure 250 can configure a sealing space, which surrounds the one or more vibration generating apparatuses 200, in the rear surface 100*a* of the passive vibration member 100, and thus, can constantly maintain an impedance component (or an air impedance or an elastic impedance) acting on the passive vibration member 100 with air, thereby enhancing a sound characteristic and/or a sound pressure level characteristic of a low-pitched sound band and the sound quality of a high-pitched sound band.

A vibration apparatus and an apparatus including the same according to some embodiments of the present disclosure will be described below.

A vibration apparatus according to an embodiment of the present disclosure includes a vibration generating portion including at least one or more vibration portions, a first cover member at a first surface of the vibration generating portion, a second cover member at a second surface of the vibration generating portion, the second surface being different from the first surface of the vibration generating portion, a signal cable electrically connected with the vibration generating portion, and a connection member between the first cover member and the second cover member and configured to connect the vibration generating portion with the signal cable.

According to some embodiments of the present disclosure, each of the at least one or more vibration portions can include a vibration layer including a piezoelectric material, a first electrode layer at a first surface of the vibration layer, and a second electrode layer at a second surface of the vibration layer being different from the first surface of the vibration layer. The connection member can be connected with each of the first electrode layer and the second electrode layer.

According to some embodiments of the present disclosure, the signal cable can be disposed between the second electrode layer and the second cover member.

According to some embodiments of the present disclosure, the signal cable can be electrically connected with the first electrode layer and the second electrode layer by the connection member.

According to some embodiments of the present disclosure, the signal cable can include a first signal line electrically connected with the first electrode layer and a second signal line electrically connected with the second electrode layer.

According to some embodiments of the present disclosure, the connection member can include a first connection portion connecting the first electrode layer with the first signal line, a second connection portion connecting the second electrode layer with the second signal line, and a third connection portion between the first connection portion and the second connection portion.

According to some embodiments of the present disclosure, each of the first connection portion and the second connection portion can include a first conductive layer, an insulation layer on the first conductive layer, and a second conductive layer on the insulation layer.

According to some embodiments of the present disclosure, the first connection portion can include a first region adjoining the first electrode layer and a second region adjoining the second electrode layer, the first region comprises the first conductive layer, the insulation layer, and the second conductive layer, and the second region comprises the insulation layer and the second conductive layer.

According to some embodiments of the present disclosure, the vibration apparatus can further include a first hole passing through the first conductive layer, the insulation layer, and the second conductive layer of the first connection portion.

According to some embodiments of the present disclosure, the vibration apparatus can further include an adhesive accommodated in the first hole. The adhesive electrically can connect the first conductive layer and the second conductive layer of the first connection portion with each other and connects the first electrode layer with the first region of the first connection portion.

According to some embodiments of the present disclosure, the adhesive can comprise a conductive material.

According to some embodiments of the present disclosure, the insulation layer in the second region of the first connection portion can insulate first conductive layer and the second conductive layer of the first connection portion from the second electrode layer.

According to some embodiments of the present disclosure, the vibration apparatus can further include a second hole passing through the first conductive layer, the insulation layer, and the second conductive layer of the second connection portion.

According to some embodiments of the present disclosure, the vibration apparatus can further include an adhesive accommodated in the second hole. The adhesive can electrically connect the first conductive layer with the second conductive layer and connect the second electrode layer with the second connection portion.

According to some embodiments of the present disclosure, the at least one or more vibration portions can include a first vibration portion on the first cover member, and a second vibration portion on the first vibration portion.

According to some embodiments of the present disclosure, each of the first vibration portion and the second vibration portion can include a vibration layer including a piezoelectric material, a first electrode layer at a first surface of the vibration layer, and a second electrode layer at a second surface of the vibration layer being different from the first surface of the vibration layer.

According to some embodiments of the present disclosure, the vibration apparatus can further include an intermediate member between the first vibration portion and the second vibration portion.

According to some embodiments of the present disclosure, the intermediate member can comprise a concave portion provided to expose a partial region of the second electrode layer of the first vibration portion and a partial region of the first electrode layer of the second vibration portion.

According to some embodiments of the present disclosure, the signal cable can be disposed between the second electrode layer of the second vibration portion and the second cover member and can be electrically connected with the first vibration portion and the second vibration portion by the connection member.

According to some embodiments of the present disclosure, the connection member can include a first connection portion connecting a first signal line of the signal cable with the second electrode layer of the first vibration portion and the first electrode layer of the second vibration portion, a second connection portion connecting a second signal line of the signal cable with the first electrode layer of the first vibration portion and the second electrode layer of the second vibration portion, and a third connection portion between the first connection portion and the second connection portion.

According to some embodiments of the present disclosure, each of the first connection portion and the second connection portion can include a first conductive layer, an insulation layer on the first conductive layer, and a second conductive layer on the insulation layer.

According to some embodiments of the present disclosure the first connection portion can include a first region accommodated into the concave portion and connect the second electrode layer of the first vibration portion with the first electrode layer of the second vibration portion, and a second region bent from the first region and provided on the second electrode layer of the second vibration portion.

According to some embodiments of the present disclosure, the first connection portion can comprise a first hole at the first region.

According to some embodiments of the present disclosure, the vibration apparatus can further include an adhesive accommodated in the first hole. The adhesive can connect the first connection portion with the second electrode layer of the first vibration portion and the first electrode layer of the second vibration portion.

According to some embodiments of the present disclosure, the second connection portion can include a third region adjoining the second electrode layer of the second vibration portion, and a fourth region bent from the third region and adjoining the first electrode layer of the first vibration portion.

According to some embodiments of the present disclosure, the second connection portion can further include a second hole provided at the third region, and a third hole provided at the fourth region.

According to some embodiments of the present disclosure, the vibration apparatus can further include an adhesive accommodated in each of the second hole and the third hole. The adhesive at the second hole can connect the second connection portion with the second electrode layer of the second vibration portion, and the adhesive in the third hole can connect the second connection portion with the first electrode layer of the first vibration portion.

According to some embodiments of the present disclosure, the vibration apparatus can further include a fourth hole provided at the first signal line, and a fifth hole provided at the second signal line.

According to some embodiments of the present disclosure, the vibration apparatus can further include an adhesive accommodated in each of the fourth hole and the fifth hole. The adhesive at the fourth hole can connect the first signal line with the first connection portion, and the adhesive at the fifth hole can connect the second signal line with the second connection portion.

An apparatus according to an embodiment of the present disclosure can include a passive vibration member, and a vibration generating apparatus connected with the passive vibration member to vibrate the passive vibration member. The vibration generating apparatus includes a vibration generating portion including at least one or more vibration portions, a first cover member at a first surface of the vibration generating portion, a second cover member at a second surface, differing from the first surface, of the vibration generating portion, a signal cable electrically connected with the vibration generating portion, and a connection member between the first cover member and the second cover member to connect the vibration generating portion with the signal cable.

According to some embodiments of the present disclosure, the apparatus can further include an enclosure at a rear surface of the passive vibration member.

According to some embodiments of the present disclosure the passive vibration member can comprise one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a ceiling material of a building, an interior material of a building, a glass window of a building, an interior material of an aircraft, a glass window of an aircraft, and mirror, or the passive vibration member can comprise one or more materials of metal, plastic, paper, fiber, cloth, leather, wood, rubber, glass, and carbon.

According to some embodiments of the present disclosure, a vibration apparatus and an apparatus including the same can be provided where a structure and a manufacturing process can be simplified.

According to some embodiments of the present disclosure, a signal cable and a vibration apparatus can be provided as one body, and thus, can be implemented as one part.

According to some embodiments of the present disclosure, the occurrence of a crack or damage of a vibration generating portion caused by a step height between lines of a signal cable can be prevented in a manufacturing process of the vibration apparatus.

According to some embodiments of the present disclosure, a sound pressure level characteristic of a sound of an apparatus including a vibration apparatus can be enhanced.

According to some embodiments of the present disclosure, a thickness of a vibration apparatus can decrease, and thus, a weight can be reduced, thereby implementing a vibration apparatus which is lightweight.

According to some embodiments of the present disclosure, a defect such as a crack can be prevented from occurring in a vibration apparatus, and thus, a yield rate of vibration apparatuses can be enhanced, thereby implementing process optimization by decreasing production energy.

An apparatus according to an example embodiment of the present disclosure can be applied to a vibration generating apparatus and/or a sound generating apparatus provided in the apparatus. The vibration apparatus and apparatus comprising the same according to an example embodiment of the present disclosure can be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. In addition, the vibration apparatus according to some example embodiments of the present disclosure can be applied to organic light-emitting lighting apparatuses or inorganic light-emitting lighting apparatuses. When the vibration apparatus of an example embodiment of the present disclosure is applied to lighting apparatuses, the vibration apparatus can act as a lighting device and a speaker. In addition, when the vibration apparatus according to some example embodiments of the present disclosure is applied to a mobile device, or the like, the vibration apparatus can be one or more of a speaker, a receiver, and a haptic device, but embodiments of the present disclosure are not limited thereto.

It will be apparent to those skilled in the art that various modifications and variations can be made in the present disclosure without departing from the technical idea or scope of the disclosures. Thus, it is intended that the present disclosure covers the modifications and variations of this disclosure provided they come within the scope of the appended claims and their equivalents.

What is claimed is:

1. A vibration apparatus, comprising:
- a vibration generating portion including at least one or more vibration portions;
- a first cover member at a first surface of the vibration generating portion;
- a second cover member at a second surface of the vibration generating portion, the second surface being different from the first surface of the vibration generating portion;
- a signal cable electrically connected with the vibration generating portion; and
- a connection member between the first cover member and the second cover member, and configured to connect the vibration generating portion with the signal cable,
- wherein the signal cable comprises a first signal line and a second signal line electrically connected with the vibration generating portion, and
- wherein the connection member comprises:
- a first connection portion connecting the vibration generation portion with the first signal line;
- a second connection portion connecting the vibration generation portion with the second signal line; and
- a third connection portion disposed between the first connection portion and the second connection portion.

2. The vibration apparatus of claim 1, wherein each of the at least one or more vibration portions comprises:
- a vibration layer including a piezoelectric material;
- a first electrode layer at a first surface of the vibration layer; and
- a second electrode layer at a second surface of the vibration layer being different from the first surface of the vibration layer, and
- wherein the connection member is connected with each of the first electrode layer and the second electrode layer.

3. The vibration apparatus of claim 2, wherein the signal cable is disposed between the second electrode layer and the second cover member.

4. The vibration apparatus of claim 3, wherein the signal cable is electrically connected with the first electrode layer and the second electrode layer through the connection member.

5. The vibration apparatus of claim 2,
- wherein the first signal line is electrically connected with the first electrode layer, and
- wherein the second signal line is line electrically connected with the second electrode layer.

6. The vibration apparatus of claim 5,
- wherein the first connection portion connects the first electrode layer and the first signal line, and
- wherein the second connection portion connects the second electrode layer and the second signal line.

7. The vibration apparatus of claim 6, wherein each of the first connection portion and the second connection portion comprises:
- a first conductive layer;
- an insulation layer on the first conductive layer; and
- a second conductive layer on the insulation layer.

8. The vibration apparatus of claim 7, wherein the first connection portion comprises a first region adjoining the first electrode layer and a second region adjoining the second electrode layer,
- wherein the first region comprises the first conductive layer, the insulation layer, and the second conductive layer, and
- wherein the second region comprises the insulation layer and the second conductive layer.

9. The vibration apparatus of claim 8, further comprising a first hole passing through the first conductive layer, the insulation layer, and the second conductive layer of the first connection portion.

10. The vibration apparatus of claim 9, further comprising an adhesive accommodated in the first hole,
- wherein the adhesive electrically connects the first conductive layer and the second conductive layer of the first connection portion with each other, and connects the first electrode layer with the first region of the first connection portion.

11. The vibration apparatus of claim 10, wherein the adhesive comprises a conductive material.

12. The vibration apparatus of claim 8, wherein the insulation layer in the second region of the first connection portion insulates the first conductive layer and the second conductive layer of the first connection portion from the second electrode layer.

13. The vibration apparatus of claim 7, further comprising a second hole passing through the first conductive layer, the insulation layer, and the second conductive layer of the second connection portion.

14. The vibration apparatus of claim 13, further comprising an adhesive accommodated in the second hole, wherein the adhesive electrically connects the first conductive layer with the second conductive layer, and connects the second electrode layer with the second connection portion.

15. The vibration apparatus of claim 1, wherein the at least one or more vibration portions comprise:

a first vibration portion on the first cover member; and a second vibration portion on the first vibration portion.

16. The vibration apparatus of claim 15, wherein each of the first vibration portion and the second vibration portion comprises:

a vibration layer including a piezoelectric material;

a first electrode layer at a first surface of the vibration layer; and a second electrode layer at a second surface of the vibration layer being different from the first surface of the vibration layer.

17. The vibration apparatus of claim 16, further comprising an intermediate member disposed between the first vibration portion and the second vibration portion.

18. The vibration apparatus of claim 17, wherein the intermediate member comprises:

a concave portion provided to expose a partial region of the second electrode layer of the first vibration portion and a partial region of the first electrode layer of the second vibration portion.

19. The vibration apparatus of claim 18, wherein the signal cable is disposed between the second electrode layer of the second vibration portion and the second cover member, and is electrically connected with the first vibration portion and the second vibration portion through the connection member.

20. The vibration apparatus of claim 19, wherein the first connection portion connects the first signal line of the signal cable with the second electrode layer of the first vibration portion and the first electrode layer of the second vibration portion, and wherein the second connection portion connects the second signal line of the signal cable with the first electrode layer of the first vibration portion and the second electrode layer of the second vibration portion.

21. The vibration apparatus of claim 20, wherein each of the first connection portion and the second connection portion comprises:

a first conductive layer;

an insulation layer on the first conductive layer; and a second conductive layer on the insulation layer.

22. The vibration apparatus of claim 21, wherein the first connection portion comprises:

a first region accommodated into the concave portion to connect the second electrode layer of the first vibration portion with the first electrode layer of the second vibration portion; and a second region bent from the first region and provided on the second electrode layer of the second vibration portion.

23. The vibration apparatus of claim 22, wherein the first connection portion comprises a first hole in the first region.

24. The vibration apparatus of claim 23, further comprising an adhesive accommodated in the first hole, wherein the adhesive connects the first connection portion with the second electrode layer of the first vibration portion and the first electrode layer of the second vibration portion.

25. The vibration apparatus of claim 23, wherein the second connection portion comprises:

a third region adjoining the second electrode layer of the second vibration portion; and a fourth region bent from the third region and adjoining the first electrode layer of the first vibration portion.

26. The vibration apparatus of claim 25, wherein the second connection portion further comprises:

a second hole provided in the third region; and a third hole provided in the fourth region.

27. The vibration apparatus of claim 26, further comprising an adhesive accommodated in each of the second hole and the third hole, wherein the adhesive in the second hole connects the second connection portion with the second electrode layer of the second vibration portion, and wherein the adhesive in the third hole connects the second connection portion with the first electrode layer of the first vibration portion.

28. The vibration apparatus of claim 26, further comprising:

a fourth hole provided in the first signal line; and a fifth hole provided in the second signal line.

29. The vibration apparatus of claim 28, further comprising an adhesive accommodated in each of the fourth hole and the fifth hole, wherein the adhesive in the fourth hole connects the first signal line with the first connection portion, and wherein the adhesive in the fifth hole connects the second signal line with the second connection portion.

30. An apparatus, comprising:

a passive vibration member; and a vibration generating apparatus connected with the passive vibration member to vibrate the passive vibration member, wherein the vibration generating apparatus comprises the vibration apparatus of claim 1.

31. The apparatus of claim 30, further comprising an enclosure disposed at a rear surface of the passive vibration member.

32. The apparatus of claim 30, wherein the passive vibration member comprises one or more of:

a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a ceiling material of a building, an interior material of a building, a glass window of a building, an interior material of an aircraft, a glass window of an aircraft, and a mirror, or wherein the passive vibration member comprises one or more materials among metal, plastic, paper, fiber, cloth, leather, wood, rubber, glass, and carbon.

* * * * *